(12) United States Patent
Su

(10) Patent No.: US 10,831,417 B1
(45) Date of Patent: Nov. 10, 2020

(54) CONVOLUTIONAL NEURAL NETWORK BASED COPY OR PRINT WIZARD

(71) Applicant: KYOCERA Document Solutions Inc., Osaka (JP)

(72) Inventor: Dongpei Su, Palos Verdes Estates, CA (US)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/443,431

(22) Filed: Jun. 17, 2019

(51) Int. Cl.
| | | |
|---|---|---|
| *G06F 3/12* | (2006.01) | |
| *G06N 20/00* | (2019.01) | |
| *G06T 5/00* | (2006.01) | |
| *G06N 3/04* | (2006.01) | |
| *G06T 5/40* | (2006.01) | |

(52) U.S. Cl.
CPC ......... *G06F 3/1208* (2013.01); *G06N 3/0454* (2013.01); *G06N 20/00* (2019.01); *G06T 5/002* (2013.01); *G06T 5/003* (2013.01); *G06T 5/40* (2013.01); *G06F 3/1287* (2013.01)

(58) Field of Classification Search
CPC ..... G06F 3/1208; G06F 3/1287; G06N 20/00; G06N 3/0454; G06T 5/002; G06T 5/003; G06T 5/40
USPC ....................................................... 358/1.15
See application file for complete search history.

(56) References Cited

U.S. PATENT DOCUMENTS

| | | | | |
|---|---|---|---|---|
| 2009/0059286 | A1* | 3/2009 | Yamaguchi | H04N 1/00472 358/1.15 |
| 2015/0142704 | A1* | 5/2015 | London | G06N 5/022 706/11 |
| 2016/0203525 | A1* | 7/2016 | Hara | G06Q 30/0271 705/14.56 |
| 2017/0032222 | A1* | 2/2017 | Sharma | G06K 9/6256 |
| 2017/0317983 | A1* | 11/2017 | Kompalli | G06K 9/00442 |
| 2018/0150740 | A1* | 5/2018 | Wang | G06K 9/2054 |
| 2019/0199864 | A1* | 6/2019 | Nakamura | H04N 1/00161 |
| 2020/0082218 | A1* | 3/2020 | Hoehne | G06F 40/279 |

* cited by examiner

*Primary Examiner* — Allen H Nguyen
(74) *Attorney, Agent, or Firm* — McDonnell Boehnen Hulbert & Berghoff LLP

(57) ABSTRACT

Methods and apparatus for utilizing a machine learning system are provided. A printing device can receive a source image and provide, to a trained machine learning configured to provide predict potential quality issues associated with images, the source image. The printing device can then obtain, from the trained machine learning system, one or more outputs indicating at least one potential quality issue associated with the source image. The printing device can then determine, using a solutions database, one or more image enhancements to resolve the at least one potential quality issue. The printing device can then provide, by way of a graphical interface, information about the one or more image enhancements.

16 Claims, 15 Drawing Sheets

900

910 Receiving one or more images associated with a printed page, where the printed page has been printed by a printer engine of the printing device 920 Providing, to a trained machine learning system, the one or more images, the trained machine learning system comprising one or more trained convolutional neural networks (CNNs) configured to receive an image depicting at least a portion of page a printed by the printer engine and to provide one or more outputs related to potential defects associated with the printer engine 930 Obtaining, from the trained machine learning system, one or more outputs indicating at least one potential defect associated with the printer engine 940 Determining, using a solutions database, whether one or more solutions to resolve the at least one potential defect associated with the printer engine are available 950 After determining that one or more solutions to resolve the at least one potential defect are available, providing, by way of a graphical interface, information about the one or more solutions.

FIG. 9

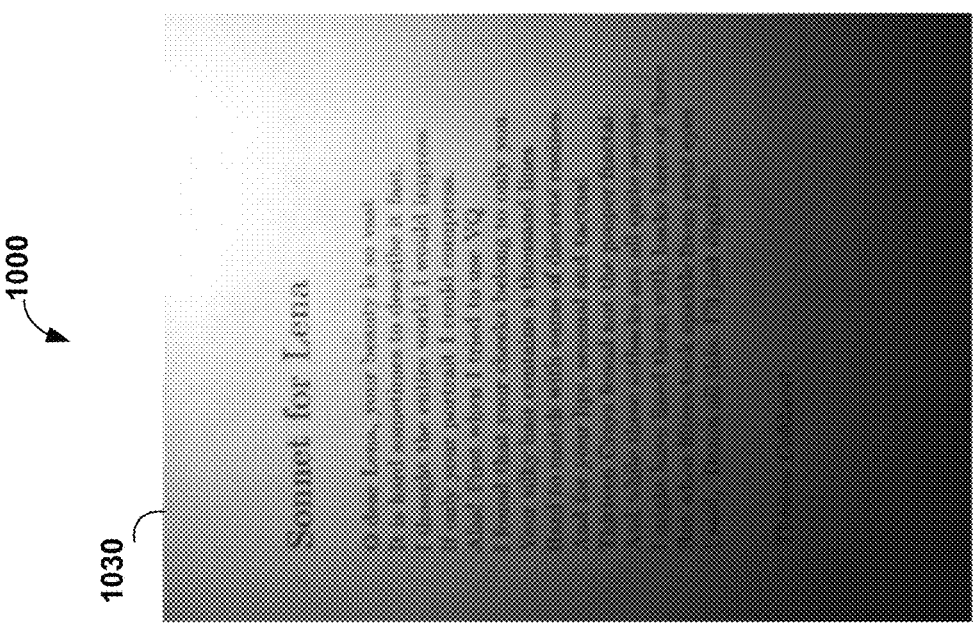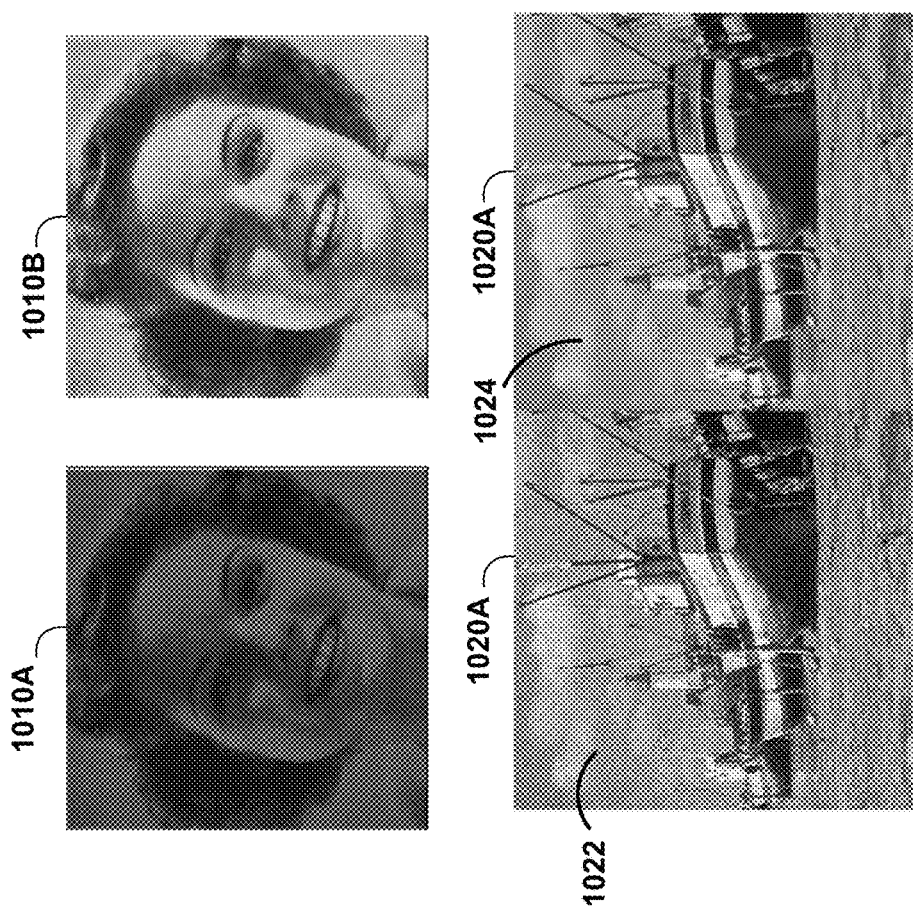
FIG. 10A

CONVOLUTIONAL NEURAL NETWORK BASED COPY OR PRINT WIZARD

BACKGROUND

Printing devices can have different features, functions, and capabilities. For example, some printing devices print in color, while others do not. As another example, some printing devices are equipped with duplexing hardware that allows printing on both sides of a sheet of paper, while other printing devices can only print on one side of a sheet of paper.

Over time, a printing device can exhibit various kinds of defects. Some of these defects, once diagnosed, can be resolved onsite by adjusting settings, while other defects can require professional help. Regardless, if defects remain undiagnosed, the effectiveness of the printing device can decrease dramatically. Thus, the ability to quickly and accurately analyze defects of the printing device can greatly improve the experience of a printing device user.

Moreover, during a copy job or print job, a printing device may render a digital image in memory before printing the image. Occasionally, the digital image to be printed is of poor quality. For example, the image may have poor lighting or low contrast. Yet in most circumstances, the printing device can neither detect these poor quality issues nor apply any enhancement to improve the quality of the digital image before printing.

SUMMARY

In a first aspect, a method is provided. A printing device receives one or more images associated with a printed page, where the printed page has been printed by a printer engine of the printing device. The printing device provides, to a trained machine learning system, the one or more images. The trained machine learning system comprises one or more trained convolutional neural networks (CNNs) configured to receive an image depicting at least a portion of a page printed by the printer engine and to provide one or more outputs related to potential defects associated with the printer engine. Further, the printing device obtains, from the trained machine learning system, one or more outputs indicating at least one potential defect associated with the printer engine and determines, using a solutions database, whether one or more solutions to resolve the at least one potential defect associated with the printer engine are available. After determining that the one or more solutions to resolve the at least one potential defect are available, the printing device provides, by way of a graphical interface, information about the one or more solutions.

In a second aspect, a printing device is provided. The printing device includes one or more processors; and non-transitory data storage. The non-transitory data storage stores at least computer-readable instructions that, when executed by the one or more processors, cause the printing device to perform operations. The operations include: receiving one or more images associated with a printed page, where the printed page has been printed by a printer engine of the printing device; providing, to a trained machine learning system, the one or more images, where the trained machine learning system comprises one or more trained convolutional neural networks (CNNs) configured to receive an image depicting at least a portion of a page printed by the printer engine and to provide one or more outputs related to potential defects associated with the printer engine; obtaining, from the trained machine learning system, one or more outputs indicating at least one potential defect associated with the printer engine. The operations further include: after determining that one or more solutions to resolve the at least one potential defect are available, providing, by way of a graphical interface, information about the one or more solutions.

In a third aspect, an article of manufacture is provided. The article of manufacture includes non-transitory data storage storing at least computer-readable instructions that, when executed by one or more processors of a printing device, cause the printing device to perform tasks. The tasks include: receiving one or more images associated with a printed page, where the printed page has been printed by a printer engine of the printing device; providing, to a trained machine learning system, the one or more images, where the trained machine learning system comprises one or more trained convolutional neural networks (CNNs) configured to receive an image depicting at least a portion of a page printed by the printer engine and to provide one or more outputs related to potential defects associated with the printer engine; obtaining, from the trained machine learning system, one or more outputs indicating at least one potential defect associated with the printer engine. The tasks further include: after determining that one or more solutions to resolve the at least one potential defect are available, providing, by way of a graphical interface, information about the one or more solutions.

In a fourth aspect, a method is provided. A printing device receives a source image. The printing device provides, to a trained machine learning system, one or more images related to the source image. The trained machine learning system comprises one or more trained convolutional neural networks (CNNs) configured to receive an image and to provide one or more outputs related to potential quality issues associated with the image. The printing device obtains, from the trained machine learning system, one or more outputs indicating at least one potential quality issue associated with the source image. The printing device determines, using a solutions database, one or more image enhancements to resolve the at least one potential quality issue associated with the source image. The printing device provides, by way of a graphical interface, information about the one or more image enhancements.

In a fifth aspect, a printing device is provided. The printing device includes one or more processors; and non-transitory data storage. The non-transitory data storage stores at least computer-readable instructions that, when executed by the one or more processors, cause the printing device to perform operations. The operations include: receiving a source image; providing, to a trained machine learning system, one or more images related to the source image, where the trained machine learning system comprises one or more trained convolutional neural networks (CNNs) configured to receive an image and to provide one or more outputs related to potential quality issues associated with the image; obtaining, from the trained machine learning system, one or more outputs indicating at least one potential quality issue associated with the source image; determining, using a solutions database, one or more image enhancements to resolve the at least one potential quality issue associated with the source image; and providing, by way of a graphical interface, information about the one or more image enhancements.

In a sixth aspect, an article of manufacture is provided. The article of manufacture includes non-transitory data storage storing at least computer-readable instructions that, when executed by one or more processors of a computing device, cause the computing device to perform tasks. The tasks include: receiving a source image; providing, to a trained machine learning system, one or more images related to the source image, where the trained machine learning system comprises one or more trained convolutional neural networks (CNNs) configured to receive an image and to provide one or more outputs related to potential quality issues associated with the image; obtaining, from the trained machine learning system, one or more outputs indicating at least one potential quality issue associated with the source image; determining, using a solutions database, one or more image enhancements to resolve the at least one potential quality issue associated with the source image; and providing, by way of a graphical interface, information about the one or more image enhancements.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 9 shows a flowchart for a method, according to example embodiments.

FIGS. 10A and 10B illustrate images associated with quality issues, in accordance with example embodiments.

DETAILED DESCRIPTION

Figure 1:
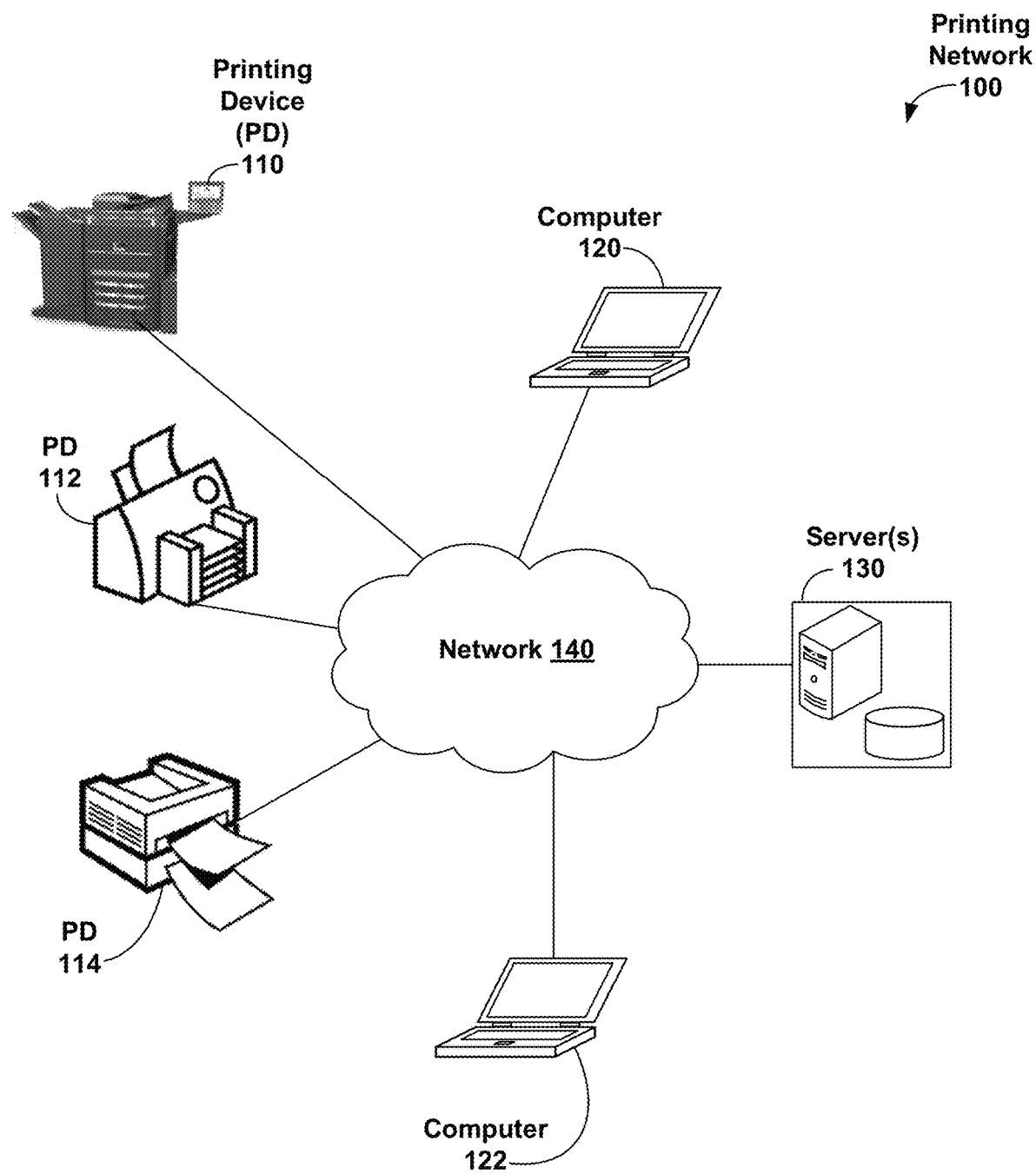
FIG. 1 is a diagram of a printing network, according to example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. INTRODUCTION

During a copy or printjob, a printing device may render a digital representation of an image in memory before sending the image to a printer engine to be printed. In some cases, the digital representation (referred to herein as a source image) contains quality issues that can affect the actual image printed by the printer engine (referred to herein as a resulting image). As an example, the source image can have low contrast, which can cause the resulting image to appear flat and dull colored. In another example, the source image can have non-uniform illumination, which can cause the resulting image to appear dark and gloomy.

Traditionally, printing devices can neither detect quality issues nor apply any image enhancement to improve the quality a source image before sending the image to be printed. Rather, in most scenarios, a user of a printing device first retrieves the source image from the memory of the printing device and then transfers the source image to a separate computing device equipped with image processing software. The user then analyzes the quality issue and applies an appropriate tool to improve the quality of the source image. Such an approach is lengthy and cumbersome. Not only is specialized image processing software required, but the user must be trained to understand the cause of the quality issue and the tools that can be applied to solve the issue.

Moreover, even if a source image contains no quality issues, a printer engine of the printing device can exhibit various kinds of defects and malfunctions, which can cause the printer engine to print defective images. As one example, a resulting image can contain Moire patterns caused by a microstructure interfering with halftone of the printer engine. In another example, a resulting image can contain white gaps caused by color plane offsets of the printer engine.

While most printer engine defects exhibit unique characteristics, it can be difficult to expect a user of the printing device to correctly diagnose the problem and take the most sensible action to address the printer engine defect. A user of the printer device likely has limited knowledge in diagnosing the cause of the printer engine defect or any knowledge of proper actions for fixing the printer engine. Moreover, the large number of possible printer engine defects can make user diagnosis of such defects impractical.

To address these and other issues, herein described are techniques and apparatuses for a machine learning (ML) system that can report potential quality issues and/or printer engine defects in real time. Such a machine learning system can be part of a specialized embedded controller on a printing device. The specialized embedded controller can be configured to implement one or more machine learning "models" or trained machine learning systems that can be remotely updated.

In some examples, the machine learning model can include one or more convolutional neural networks (CNNs) used to detect quality issues and/or printer engine defects. Each CNN can be trained on a training dataset containing source images with known quality issues or resulting images that exhibit defects that result from known printer engine issues. Training images can be labeled with the type of quality issue and/or printer engine defect that the image depicts. Training data sets can also contain several "normal" images to inform the CNN of how images without quality issues and/or associated printer engine defects appear.

Once trained, the machine learning model can be configured to automatically detect quality issues and/or printer engine defects. In line with the discussion above, upon receiving a request to print a source image, the printing device can apply the machine learning model on the source image to predict one or more quality issues associated with the source image. Also, when scanning a defective resulting image into the printing device, the printing device can apply the machine learning model to predict one or more printer engine defects associated with the defective resulting image.

To predict a wide range of quality issues and/or printer engine defects, the machine learning system can be configured to make predictions using both global images (i.e., images that capture the entirety of an original image) and local images (i.e., images that capture a portion of an original image). Global images can be used to detect quality issues/printer engine defects that can affect an entire image, such as gradient contours. A global image can be obtained by creating a thumbnail, or relatively-small, image that captures the entirety of the original, relatively-large image and perhaps by other techniques. Local images can be used for detecting quality issues/printer engine defects that can affect a portion of an image, such as white gaps. Local images can be obtained by performing a scanning operation on the original image, by sampling the original image, and perhaps by other techniques.

Upon making a prediction with regards to one or more quality issues/printer engine defects, the machine learning model can report one or more actionable recommendations to resolve quality issues or printer engine defects via the user interface of the printing device. For example, the actionable recommendations can involve enhancement recommendations to improve the overall quality of an image. Enhancement recommendations can include super-resolution, denoising, dehazing, histogram equalizations, and/or other techniques. One or more of the enhancement recommendations can be selected for execution by the printing device before printing out the source image.

As another example, actionable recommendations can involve, based on the prediction made by the machine learning model, retrieving potential repairs from a solution database and reporting to user a recommended action to take. Repairs can include contacting the printing device manufacturer, applying automatic software updates of the printing device, and/or providing instructions for manually addressing the issue.

As such, the herein-described techniques can be used to improve a printing device's performance by improving the quality of the images printed by the device and saving service costs by identifying the defects of a printer engine on the printing device before any repair technician is sent. Moreover, by using machine learning models, the embodiments herein can diagnose more complex and/or more varied problems than traditional image processing techniques; e.g., the machine learning models can detect problems preemptively (i.e., before they become visible to the user), the machine learning models can diagnose more problems than known to a repair technician, and so on. Other advantages and improvements are also possible and may be appreciated from the discussion below.

II. EXAMPLE PRINTING SYSTEM

FIG. 1 is a diagram illustrating printing network 100, according to example embodiments. Printing network 100 includes printing devices (PDs) 110, 112, 114, computers 120, 122, and one or more servers 130, all interconnected using network 140. In some examples, printing network 100 can have more, fewer, and/or different types of computing devices, servers, and/or printing devices than indicated in FIG. 1.

Printing devices 110, 112, 114 can include devices configured to scan, print, copy, e-mail, account for, communicate and/or otherwise process documents and/or files that are originally available either on paper or electronically. After processing by one or more of printing devices 110, 112, 114, the documents and/or files can be subsequently available either on paper or electronically, as requested. That is, printing devices 110, 112, 114 can process a paper document PD or electronic document ED by at least: creating an electronic document ED1 representing the contents of PD (e.g., scan PD to create ED1), making one or more paper copies of PD, printing one or more copies of ED and/or ED1 on one or more types of paper, make one or more electronic copies of ED and/or ED1, change a format of ED and/or ED1 (e.g., perform OCR scanning, convert a file format used to store ED and/or ED1), maintain remotely-accessible storage (e.g., a document box) enabling other devices than printing devices 110, 112, 114 to use/access ED and/or ED1, and/or communicate the contents of ED and/or ED1 to/from another device.

A document box can be storage allocated to an entity (e.g., a user, an administrator, a company, another type of entity) on a printing device, print server, or another device so the entity can keep and maintain documents, files, and/or other data. In some embodiments, the document box can be accompanied by and/or include storage for personal data, such as address book and/or device accounting storage. The document box, address book, and device accounting storage can store one or more documents, files, personal data, and/or other data, such as contacts, usage and usage limits.

In some embodiments, printing devices 110, 112, 114 can perform other tasks and/or other processing as well. Printing devices 110, 112, 114 can include products from various manufacturers with variations in color, speed, computing power, functionality, network connectivity, and/or other features.

In example embodiments, some or all printing devices 110, 112, 114 can be connected to network 140 through one or more, possibly different, network protocols. Data can be transmitted between printing devices 110, 112, 114, computers 120, 122, and server(s) 130 over wired and/or wireless links between computers, computing devices, printing devices, servers and network 140. The format of each respective data transmission between devices in printing network 100 can include one or more of a variety of different formats including: text formats, image formats, extensible mark-up language (XML), Simple Network Maintenance Protocol (SNMP) formats, database tables, a flat file format, or another format.

Communications between the computers, computing devices, servers, and printing devices can include: computers 120, 122, and/or server(s) 130 sending data for print jobs and/or print job portions for printing to printing devices 110, 112, 114 and printing devices 110, 112, 114 sending alert, status, error, device information, colorant-usage information, maintenance-event information, and/or other messages to computers 120, 122, and/or server(s) 130 to inform other devices about colorant-usage, maintenance, error, and/or other conditions of the printing devices; e.g., idle, printing, sleeping, paper jam, low or out of paper, low or out of toner/ink, etc. Other communications between computers 120, 122, and/or server(s) 130 are possible as well, such as, but not limited to, requests to render images using radial gradient coloring and related responses to the requests.

Computers 120, 122 can create, obtain, update, display, and/or delete data (and perhaps related software) for configurations of printing network 100. Example data for configurations of printing network 100, includes, but is not limited to: data for configuring devices in printing network 100; e.g., data for printing devices 110, 112, 114, data for configuring network protocols (e.g., File Transfer Protocol (FTP), HyperText Transfer Protocol (HTTP), Java Message Service (JMS), Kyocera Page Description Language (KPDL™), Private Communications Technology (PCT), Adobe® Page Description Format (PDF), Simple Object Access Protocol (SOAP), Short Message Service (SMS), Simple Message Transfer Protocol (SMTP), SNMP, Transfer Control Protocol/Internet Protocol (TCP/IP), User Datagram Protocol (UDP), Lightweight Directory Access Protocol (LDAP), Message Queue (MQ), and/or other protocols), access-management related data for clients and/or servers; (e.g., passwords, signatures, credentials, certificates, subscriptions, licenses, and/or tokens related to accessing part or all of the functionality of network 140 and/or cloud-based services, software and/or solutions) and data for customizing, configuring and managing applications on devices/servers of printing network 100. In particular, computers 120, 122 can provide displays related to maintaining printing devices, including displays related to colorant usage for printing devices and/or predictions related to colorant usage, where the printing devices can include but are not limited to printing devices 110, 112, 114.

One or more servers 130 can store, update, delete, retrieve, and provide functionality for learning patterns, trends, and/or features about data related to printing network 100, particularly related to printing devices, such as printing devices 110, 112, 114. Based on the learned patterns, trends, and/or features, server(s) 130 can generate outputs, such as predictions about the printing devices including but not limited to predictions of colorant usage by the printing devices. The data stored on server(s) 130 can include device information, colorant-usage information, maintenance-event information, and/or other information related to devices related to printing network 100. The stored data can be retrieved from server(s) 130 in response to a received query (or queries) requesting information about specific device(s), colorant usage, maintenance events, and/or other information.

In some embodiments, server(s) 130 can provide additional services as well (or instead of), such as services related to some or all of the functionality for one or more document solutions and managed print services; e.g., functionality for accounting and maintenance of solutions and services, functionality for document workflows, such as processing forms, hard-copy signatures, client authentication/access functions, user interface functionality, local and/or remote network based storage management involving devices in printing network 100. For example, server(s) 130 additionally can provide functionality related to a print server. A print server can process jobs (e.g., spool job-related data, route jobs, provide user and/or server-related accounting for jobs, verify/enforce authentication and authorization rules related to jobs) and store data related to printing devices of printing network 100. The jobs processed by a print server can include, but are not limited to, print jobs/printing requests, communicating documents, files, and/or related data (e.g., data in e-mails, SMS messages, etc.). Other jobs may include document and file-related requests (e.g., creating, formatting, scanning, reformatting, converting, accessing, updating and/or deleting one or more documents and files), jobs for document workflow, and/or processing information about errors/complaints about the printing device (e.g., creating, reviewing, updating, assigning, reassigning, communicating, and/or deleting trouble tickets related to errors/complaints about printing (and perhaps other) devices 110, 112, 114. The data can include data used in processing jobs (e.g., spooled data for print jobs, files for file-related requests, etc.), access-management related data, primary identification characteristics and/or model-dependent information about printing devices served by server(s) 130 and perhaps other data.

Figure 2:
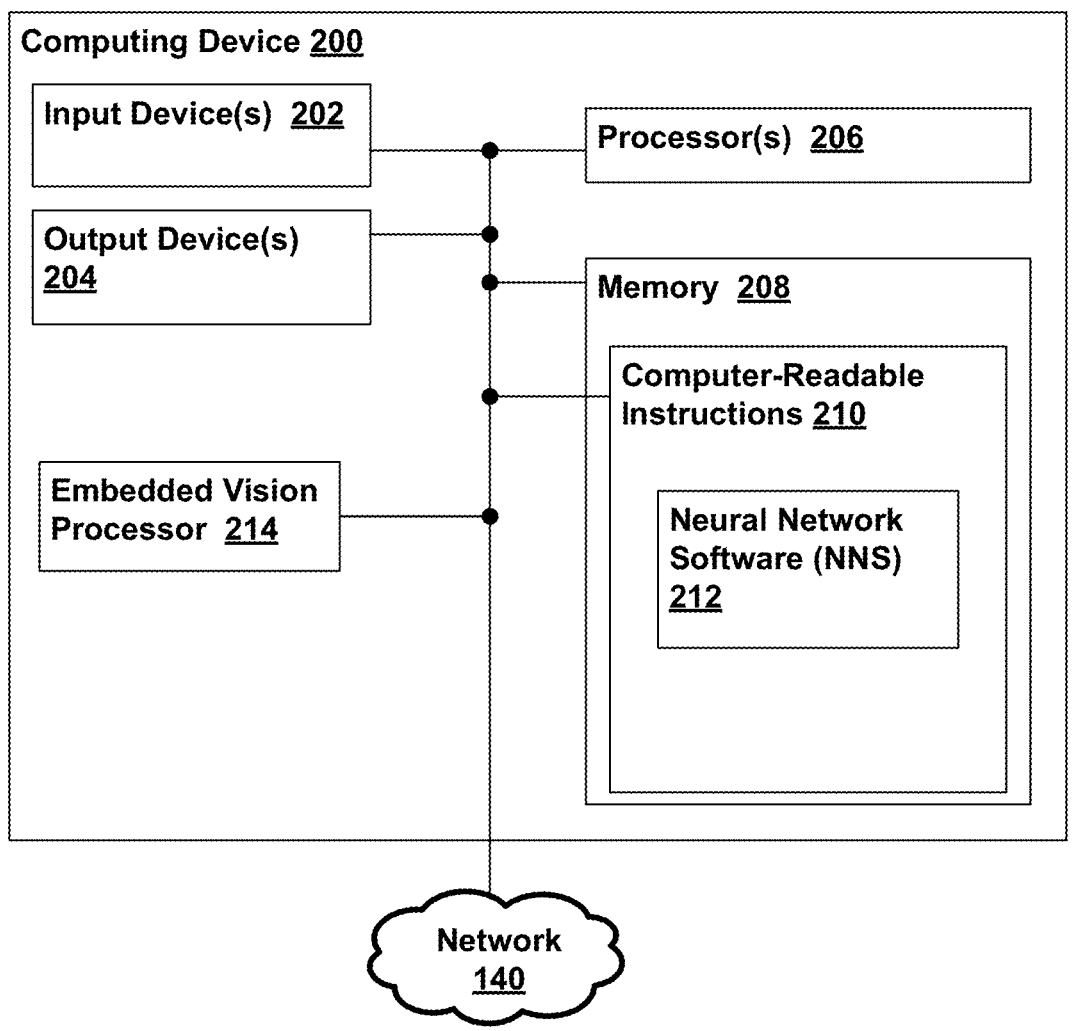
FIG. 2 is a block diagram illustrating a computing device, according to example embodiments.

FIG. 2 is a schematic block diagram illustrating computing device 200, according to example embodiments. Computing device 200 can include one or more input devices 202, one or more output devices 204, one or more processors 206, memory 208, and embedded vision processor (EVP) 214. In some embodiments, computing device 200 can be configured to perform one or more herein-described functions of and/or functions related to: e.g., some or all of at least the functionality described in the context of an artificial neural network, a convolutional neural network, a computer, a printing device, a personal computer, a server device, a print server, a printing network, printing network 100, pipelines 300, 400, methods 800, 900, 1200, 1300, and printing devices 700, 1100.

Input devices 202 can include user input devices, network input devices, sensors, and/or other types of input devices. For example, input devices 202 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 140, and/or wireless network receivers and/or transceivers, such as a Bluetooth™ transceiver, a Zigbee® transceiver, a Wi-Fi™ transceiver, a WiMAX™ transceiver, a wireless wide-area network (WWAN) transceiver and/or other similar types of wireless transceivers configurable to communicate via a wireless network, such as wireless portions of network 140. Other input devices 202 are possible as well.

Output devices 204 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a USB transceiver, or similar transceiver configurable to communicate via a twisted pair wire, a coaxial cable, a fiber-optic link, or a similar physical connection to a wireline network, such as wired portions of network 140, and/or wireless network transmitters and/or transceivers, such as a Bluetooth™ transceiver, a Zigbee® transceiver, a Wi-Fi™ transceiver, a WiMAX™ transceiver, a WWAN transceiver and/or other similar types of wireless transceivers configurable to communicate via a wireless network, such as wireless portions of network 140. Other types of output devices can include, but are not limited to, vibration devices, haptic feedback devices, and non-visible light emission devices; e.g., devices that emit infra-red or ultra-violet light. Other output devices 204 are possible as well.

Processors 206 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), additional graphics-related circuitry/processors, etc.). Processors 206 can be configured to execute computer-readable instructions 210 that are contained in memory 208 and/or other instructions as described herein.

Memory 208 can include one or more computer-readable storage media configured to store data and/or instructions that can be read and/or accessed by at least one of processors 206. The one or more computer-readable storage media can include one or more volatile and/or non-volatile storage components, such as optical, magnetic, organic or other memory or disc storage, which can be integrated in whole or in part with at least one of processors 206. The computer-readable storage media can include one or more components that store data for short periods of time like register memories, processor caches, and/or random access memories (RAM). The computer-readable storage media can include non-transitory computer readable media that stores program code and/or data for longer periods of time, such as secondary or persistent long term storage; for example, read only memory (ROM), optical or magnetic disks, compact-disc read only memory (CD-ROM). In some embodiments, memory 208 can be implemented using a single physical device (e.g., one optical, magnetic, organic or other memory or disk storage unit), while in other embodiments, memory 208 can be implemented using two or more physical devices. In particular, memory 208 can store computer-readable instructions 210 that, when executed by processor(s) 206, can cause a computing device to perform functions, such as but not limited to, some or all of at least the herein-described functionality of devices, networks, methods, diagrams, images, equations, and/or scenarios.

In some embodiments, computer-readable instructions 210 can include at least instructions for neural network software 212. Neural network software 212 can include software and/or firmware for providing neural-network-related and/or machine-learning-algorithm-related functionality; e.g., some or all of at least the functionality described in the context of an artificial neural network, a convolutional neural network, a computer, a personal computer, a server device, a print server, a printing device, a printing network, printing network 100, pipelines 300, 400, methods 800, 900, 1200, 1300, and printing devices 700, 1100. In some examples, neural network software 212 can be updated or otherwise reprogrammed, for example via connections with network 140, to provide different neural-network-related and/or machine-learning-algorithm-related functionality.

Embedded vision processor 214 can include one or more specialized processors used to execute neural network software 212. In particular, embedded vision processor 214 can contain one or more vector DSPs, application-specific standard products (ASSPs) processors, vision processing units (VPUs), tensor processing units (TPUs), and/or other AI accelerator processors designed for computer vision and image processing.

III. EXAMPLE MACHINE LEARNING SYSTEMS

Figure 3:
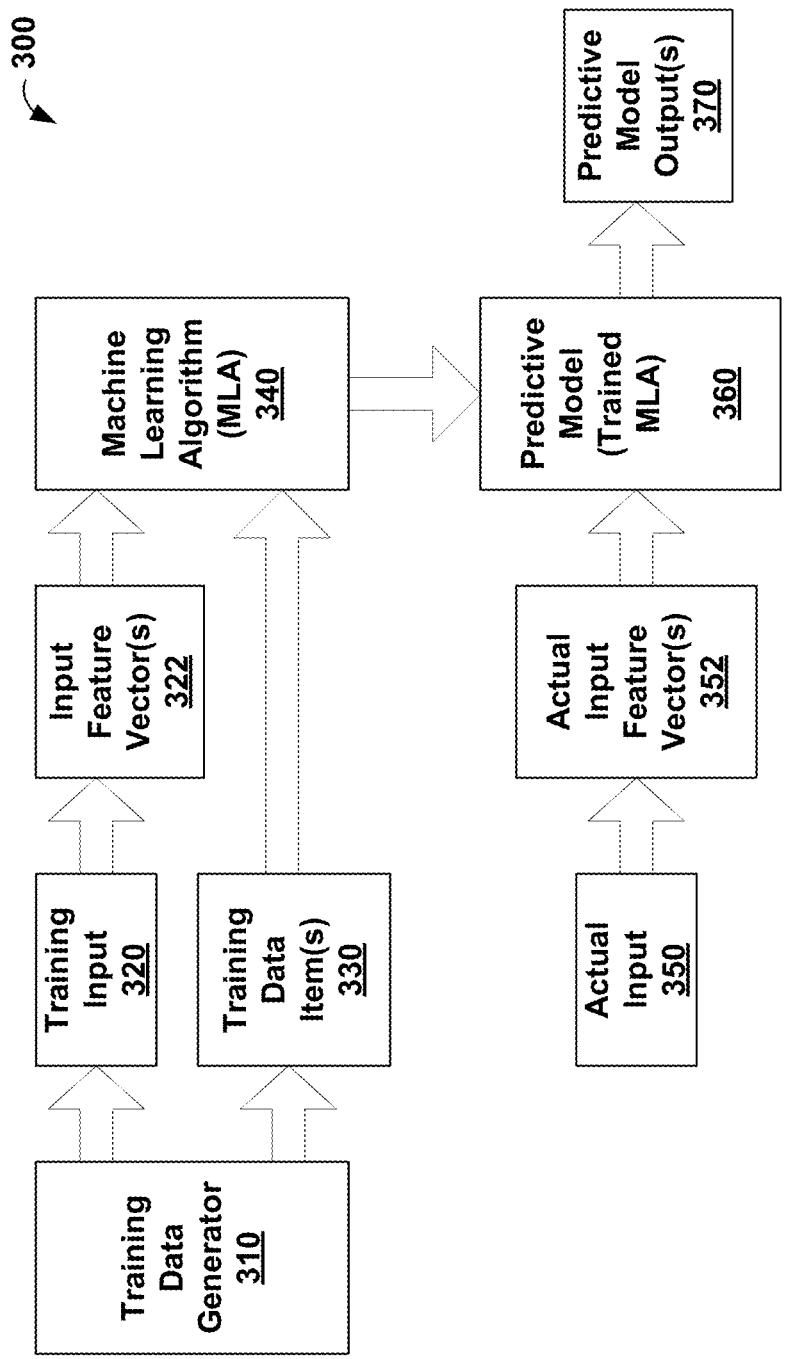
FIG. 3 is a diagram of a supervised learning pipeline, according to example embodiments.

FIG. 3 is a diagram of a supervised learning pipeline 300, according to example embodiments. Supervised learning pipeline 300 includes training data generator 310, training input 320, one or more input feature vectors 322, one or more training data items 330, machine learning algorithm 340, actual input 350, one or more actual input feature vectors 352, predictive model 360, and one or more predictive model outputs 370. Part or all of supervised learning pipeline 300 can be implemented by executing software for part or all of supervised learning pipeline 300 on one or more processing devices and/or by using other circuitry (e.g., specialized hardware for carrying out part or all of supervised learning pipeline 300, such as embedded vision processor 214).

In operation, supervised learning pipeline 300 can involve two phases: a training phase and a prediction phase. The training phase can involve machine learning algorithm 340 learning one or more tasks. The prediction phase can involve predictive model 360, which can be a trained version of machine learning algorithm 340, making predictions to accomplish the one or more tasks. In some examples, machine learning algorithm 340 and/or predictive model 360 can include, but are not limited to, one or more: artificial neural networks (ANNs), deep neural networks, convolutional neural networks (CNNs), recurrent neural networks, support vector machines (SVMs), Bayesian networks, genetic algorithms, linear classifiers, non-linear classifiers, algorithms based on kernel methods, logistic regression algorithms, linear discriminant analysis algorithms, and/or principal components analysis algorithms.

During the training phase of supervised learning pipeline 300, training data generator 310 can generate training input 320 and training data item(s) 330. Training input 320 can be processed to determine input feature vector(s) 322. In some examples, training input 320 can be preprocessed, for example, for image recognition tasks.

In examples, training input 320 can include one or more images. Specifically, training input 320 can include images collected by a printing device provider that exhibit known quality issues and/or deformities associated with printer engine defects. In some cases, training input 320 can include images collected from web scrapers configured to retrieve images exhibiting known quality issues and/or deformities associated with printer engine defects from public image datasets or the Internet. In some cases, training input 320 can contain several "normal" images that exhibit no known quality issues and/or deformities associated with printer engine defects.

In example embodiments, training input 320 can include one or more "augmented" images. That is, a normal image can be transformed, perhaps by the printing device provider, to be an augmented image that exhibits known quality issues or deformities associated with printer engine defects. For example, transformations used to create augmented images can include the use of quality degradation transformations, which can degrade the quality of a normal image, and/or the use of defect degradation transformations, which can cause a defect to appear on a normal image. Other types of transformations can be used to create augmented images as well.

Input feature vector(s) 322 can be provided to machine learning algorithm 340 to learn one or more tasks. Input feature vector(s) 322 can represent features associated with training input 320. For example, given that training input 320 can include one or more images, input feature vector(s) 322 can represent raw image pixel values, image dimension values, and so on. In a specific illustration, if training input 320 includes an image of size X*Y pixels, (with Z=1 for a greyscale image), then input feature vector(s) 322 for the image can include an X*Y matrix, where each entry in the matrix corresponds to the pixel value between 0 and 255.

Machine learning algorithm 340 can generate one or more outputs based on input feature vector(s) 322 and perhaps training input 320 related to the one or more tasks being learned. During training, training data item(s) 330 can be used to make an assessment of the output(s) of machine learning algorithm 340 for accuracy and machine learning algorithm 340 can be updated based on this assessment. More particularly, the assessment may include use of a loss function that measures inconsistencies between predicted values and ground truth values (e.g., data labels from a training data item). For example, a loss function LF1 for training machine learning algorithm 340 can be based on a mean-square-error (MSE) value representing a "Euclidean distance" between the predicted value (LF1($O_x$)) and a data label of a training data item ($O_x$). The output of the loss function can be used during the training of machine learning algorithm 340 to decide how much to adjust parameters to reduce an error value; e.g., an error value calculated based on a difference between $O_x$ and LF1($O_x$), such as $|O_x-\text{LF1}(O_x)|$ (an L1 norm) or $|\{O_x-\text{LF1}(O_x)\}^2|^{1/2}$ (an L2 norm). Other loss functions are possible as well; e.g., the loss function can be based on cross-entropy loss and/or other values.

In a more specific example of training, training input 320 can be an image and training data item(s) 330 can include one or more labels that indicate quality issues/printer engine defects associated with the image. During training, machine learning algorithm 340 can make predictions about the quality issues/printer engine defects associated with training input 320. Predictions can be compared to the label(s) of training data item(s) 330 to see if they match; e.g., if machine learning algorithm 340 detected the same quality issue as mentioned in a label for training data item(s) 330, then they match, otherwise an error can be determined. A vector of errors can be calculated, corresponding to a magnitude of difference between the predicted quality issues/printer engine defects and the labels of training data items(s) 330. Then, a loss function can compare the vector of errors predicted by machine learning algorithm 340 with a corresponding vector constructed from the labels of quality issues/printer engine defects in training data item(s) 330. The comparison can be used to adjust parameters of machine learning algorithm 340 to reduce overall error value.

Moreover, with respect to artificial neural networks (ANN), an ANN can have a number of nodes, each node being associated with a numerical weight. These nodes can be arranged in the ANN into one or more layers (e.g., such as one or more CNN layers for each of CNN model(s) 420 as described below). Training an ANN to perform a task can involve changing the weights of the nodes as training inputs related to the task are provided to and processed by the ANN. Once trained, the ANN (or model) may or may not modify the weights of the nodes once deployed for inference/detection tasks.

Training of machine learning algorithm 340 can continue until machine learning algorithm 340 is considered to be trained to perform the one or more tasks. For example, training of machine learning algorithm 340 can continue until the occurrence of one or more training termination criteria. The training termination criteria can include, but are not limited to, criteria where machine learning algorithm 340 has made predictions for IN items of training input 320 (e.g., IN=1, 10, 100, 1000, 5000, 50000, 10000000, etc.), has made predictions for each item of training input 320 a number IT times (e.g., IT=1, 2, 3, . . . ), has made prediction for a number N of items of validation input with an accuracy that exceeds a threshold accuracy value (e.g., N=1, 10, 25, 50, 100, 1000, etc., a threshold accuracy of 50%, 90%, 95%, 99%, 99.9%, etc.). Other examples are also possible. Once trained, machine learning algorithm 340 can be considered to be a predictive model, such as predictive model 360.

During the prediction phase of supervised learning pipeline 300, actual input 350 can be processed to generate actual input feature vector(s) 352. Predictive model 360 can perform predictions, for example, image recognition tasks, by taking actual input feature vector(s) 352 as inputs.

In example embodiments, predictive model 360 can generate one or more predictions about actual input feature vector(s) 352 as part or all of predictive model output(s) 370. For instance, predictive model 360 can receive a request to make a prediction about actual feature input vector(s) 352, responsively generate one or more predictions about actual input feature vector(s) 352, and provide the prediction(s) as predictive model output(s) 370. The prediction phase/use of predictive model 360 is discussed in more detail below.

In some examples, machine learning algorithm 340 can be trained on one or more training computing devices and predictive model 360 can be executed on the same training computing device(s). In other examples, machine learning algorithm 340 can be trained on the training computing device(s). Then, after training, now-trained machine learning algorithm 340 can be communicated as predictive model 360 from the training computing device(s) to one or more other computing devices that can execute predictive model 360 to generate predictive model output(s) 370.

Figure 4:
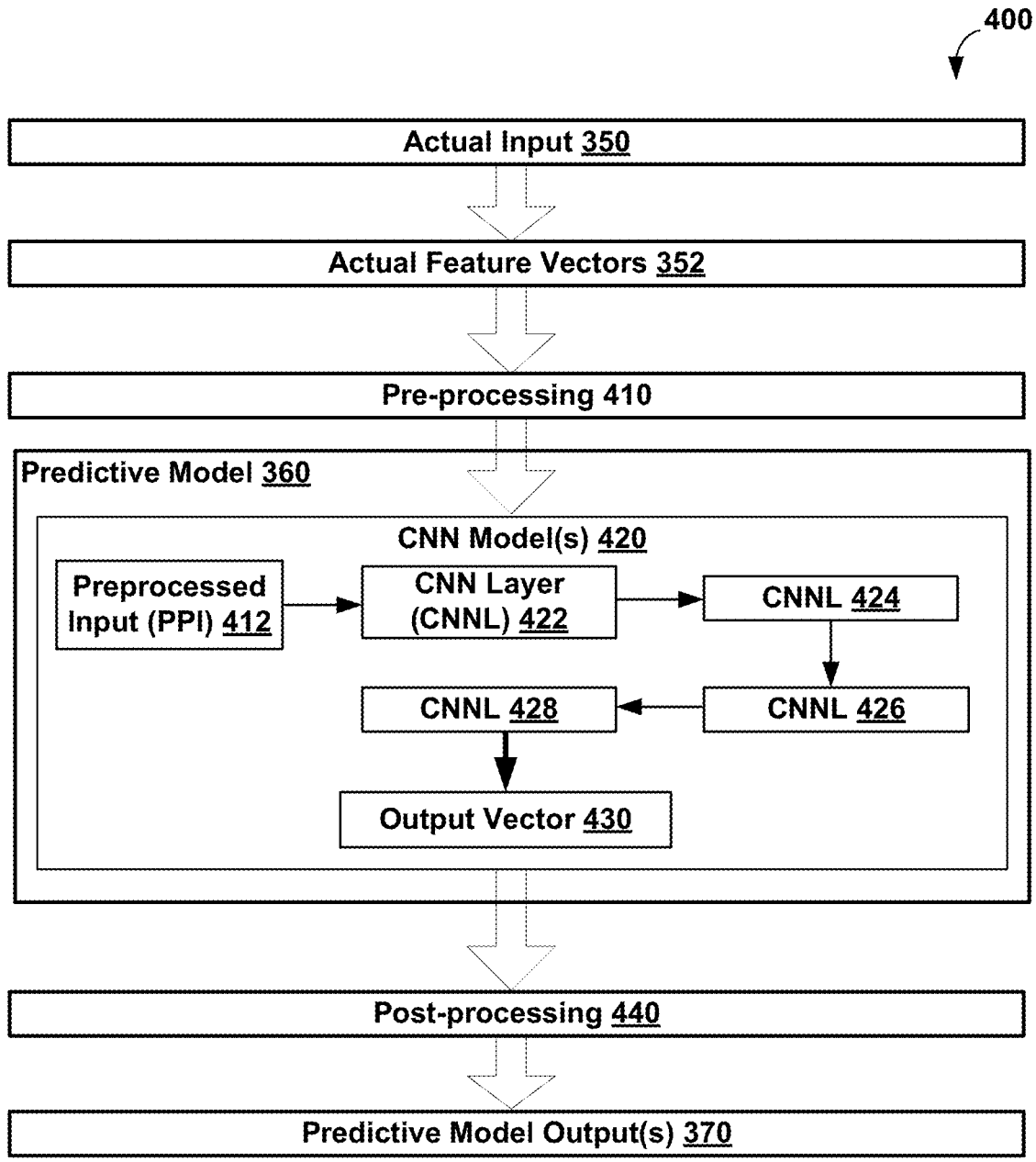
FIG. 4 is a diagram of a machine learning pipeline, according to example embodiments.

FIG. 4 is a diagram of ML pipeline 400 for image recognition, according to example embodiments. In some examples, ML pipeline 400 can be related to and/or implement the prediction phase of supervised learning pipeline 300. ML pipeline 400 includes actual input 350, actual feature input vector(s) 352, preprocessing 410, predictive model (trained MLA) 360, post-processing 440, and predictive model output(s) 370. Part or all of ML pipeline 400 can be implemented by executing software for part or all of ML pipeline 400 on one or more processing devices and/or by using other circuitry (e.g., specialized hardware for carrying out part or all of ML pipeline 400, such as embedded vision processor 214).

In operation, ML pipeline 400 can begin by receiving actual input 350. In particular, actual input 350 to ML pipeline 400 can include one or more actual electronic images. Some of actual input 350 can include one or more actual paper images, where the actual paper images can be an image of a paper page; e.g., an electronic image of a page of a scanned paper document.

After receiving actual input 350, ML pipeline 400 can generate actual input feature vector(s) 352 based on actual input 350. Actual feature vector(s) 352 can represent features of actual input 350. The feature(s) can include, but are not limited to, raw pixels values, raw image dimensions values, and so on. In a specific illustration, if actual input 350 includes an image of size X*Y pixels, (with Z=1 for a greyscale image), then actual input feature vector(s) 352 for the image can include an X*Y matrix, where each entry in the matrix corresponds to the pixel value between 0 and 255.

After generating actual input feature vector(s) 352, ML pipeline 400 can proceed to preprocessing 410. During preprocessing 410, actual input feature vector(s) 352 can be preprocessed to increase the accuracy of predictive model 360. In particular, preprocessing 410 can include normalization and mean-subtraction for rescaling numeric attributes into a more compact range principle component analysis (PCA) to reduce the dimensionality, and/or whitening transformations to reduce underlying noise in input data.

After preprocessing 410, ML pipeline 400 can proceed to use predictive model 360 to make predictions regarding preprocessed actual input feature vector(s) 352. FIG. 4 shows that predictive model 360 of ML pipeline 400 can include CNN model(s) 420. When predictive model 360 receives preprocessed actual input feature vector(s) 352 from preprocessing 410, predictive model 360 can utilize CNN model(s) 420 to classify preprocessed actual input feature vector(s) 352. The input (i.e., preprocessed actual input feature vector(s) 352 into CNN model(s) 420 may be referred to herein as preprocessed input 412.

CNN model(s) 420 can include one or more trained convolutional neural networks that perform classification on preprocessed input 412. In particular, each CNN model in CNN model(s) 420 can contain one or more CNN layers. A CNN layer can perform convolution, activation, pooling, or inference tasks using respective one or more convolution layers, one or more activation layers, one or more pooling layers, and/or one or more fully-connected layers.

Convolution layers can include one or more filters to filter respective inputs. Each filter can work over a subset of an input image. For example, if an input to a convolution layer represents an image of X*Y pixels having Z different color inputs (e.g., an image of size X*Y pixels in either Z=1 for a greyscale color image, Z=3 for a red-green-blue (RGB) image, or Z=4 for a cyan-magenta-yellow-black (CMYK) image), then the input to the convolution layer can be considered to be a X*Y*Z volume of input pixels*colors. Then, a filter of the convolution layer can filter a portion of the X*Y*Z volume (e.g., filter X1*Y1*Z1 pixels/colors, where X1<X, Y1<Y, and Z1=Z). In another example, suppose an input to convolutional layer was a 100×100 pixel image in CMYK format (Z=4). As such, the convolution layer can receive the 100×100×4 volume of pixels/colors as an input volume and may act to convolve a 3×3×4 filter over the 100×100×4 volume. To convolve the filter over the volume, the convolution layer can slide the filter across the width and height of the input volume and compute dot products between the entries of the filter and the input at each position that the filter is on the input volume. As the convolution layer slides the filter over the width and height of the input volume, the convolution layer can be considered to generate a 2-dimensional activation map that gives the responses of that filter at every spatial position of the input volume.

The output of the convolution layer (e.g., the activation map mentioned above) can be provided as an input to an activation layer. Activation layers can determine whether the activation map is to be provided to a subsequent layer. For example, suppose the activation map has values in the range [0, 1] and that only activation map values above 0.4 are to be provided to a subsequent layer. Then, the activation layer could map activation map values in the range [0, 0.4] to 0 (representing no activation), and map activation map values in the range (0.4, 1] to 1 (representing activation). More generally, a activation layer can model an activation function, such as a sigmoid/logistic activation function, a hyperbolic tangent activation function, a rectified linear unit (ReLU) activation function, or another activation function to determine whether the output of the convolution layer (e.g., the activation map) is to be provided to a subsequent layer.

Pooling layers can downsample input provided by convolution and activation layers. Pooling layers can slide a pooling filter over an input volume in a similar fashion as discussed above for the convolution. The pooling filter can carry out a function over the pixels/colors sampled. For instance, the function can determine a maximum value of the pixels/colors sampled by the pooling filter, determine an average value of the pixels/colors sampled by the pooling filter, and so on. As a specific example, if the pooling filter calculates a maximum value over a 2×2×1 input volume of pixels/colors, the pooling filter will reduce the four values in the 2×2×1 input volume to one output (maximum) value, thereby downsampling the 2×2×1 input volume to 1 value.

Fully-connected layers can have full connections to all activations in a previous layer and may act as a soft-max classifier. That is, the fully-connected layer can receive an input from a previous layer and can output a resulting N dimensional vector, where N is the number of possible predictions that could be made about actual input 350. For example, if actual input 350 was an image of a digit and if predictive model 360 was trained to classify digits within images, N would be 10.

Each output number in the resulting N dimensional vector can represent the probability of a certain class (i.e., possible prediction) occurring in actual input 350. For example, continuing from the example digit classifier, a resulting vector could appear as [0 0.1 0.1 0.75 0 0 0 0 0 0.05], where the probability that actual input 350 contains the digit 1 is 10%, the probability that actual input 350 contains the 2 is 10%, and so on. This resulting vector may be outputted by CNN model(s) 420, for example, as output vector 430.

In practice, CNN model(s) 420 can include CNNs with different combinations (also known as CNN architectures) of convolutional layers, activation layers, pooling layers, and fully-connected layers. In one example, CNN model(s) 420 can contain a CNN with a VGGNet architecture. In another example, CNN model(s) 420 can contain a CNN with an AlexNet architecture. Other CNN architectures are also possible.

As a conceptual illustration of CNN layers and their operations, CNN layers 422, 424, 426, and 428 are provided in FIG. 4. CNN layers 422, 424, 426 can selectively filter and downsample input using convolution, activation, and pooling layers to extract features, while CNN layer 428 can provide a final output prediction about actual input 350. In an example operation, preprocessed input 412 may be provided to CNN layer 422. Then, CNN layer 422 can process preprocessed input 412 (e.g., convolve, activate, and/or pool preprocessed input 412 into a first feature vector) and provide input (e.g., the first feature vector) to CNN layer 424. CNN layer 424 can process the input provided by CNN layer 422 (e.g., convolve, activate, and/or pool input provided by CNN layer 424 into a second feature vector) and provide input (e.g., the second feature vector) to CNN layer 426. CNN layer 426 can process the input provided by CNN layer 424 (e.g., convolve, activate, and/or pool input provided by CNN layer 424 into a third feature vector) and provide input (e.g., the third feature vector) to CNN layer 428. CNN layer 428 can process the input provided by CNN layer 426 (e.g., make a soft-max prediction on input provided by CNN layer 426 into a fourth feature vector) and provide output vector 430 (e.g., the fourth feature vector) as the output prediction of predictive model 360. After predictive model 360 has made a prediction (i.e., output vector 430) regarding actual input 350, ML pipeline 400 can proceed to perform post-processing 440 of output vector 430. It should be noted that CNN layers 422, 424, 426, and 428 are solely a convenient conceptual representation a CNN architecture and not intended to be limiting with respect to example embodiments or techniques described herein. For example, CNN model(s) 420 can have more, fewer, and/or different layers than CNN layers 422, 424, 426, and 428.

In some examples, post-processing 440 can include weighting methods that combine multiple predictions into a single, aggregate prediction. For instance, output vector 430 may represent one out of a myriad of predictions made by predictive model 360 with regards to actual input 350. As a specific example, if actual input 350 is an image, multiple sections of the image (e.g., 4 sections) can each be provided to predictive model 360. As such, output vector 430 may represent one out of a total of four predictions made by predictive model 360 with regards to actual input 350. Then, weighting methods can be used to combine each of the four predictions into a single, aggregate prediction. Weighting methods can be determined as a sum, or other numerical combination (e.g., an average, a weighted average, a product) of the individual outputs vectors.

In some examples, post-processing 440 can include ranking methods that curtail output vector 430 to only "relevant" classes. Continuing again from the digit classifier example, suppose that output vector 430 from predictive model 360 is [0 0.1 0.1 0.75 0 0 0 0 0.05]. In such a scenario, post-processing 440 can rank the top N classes as "relevant" and only retain classes with predicted probabilities that fall into the top N. For instance, if N=3, ranking methods may retain digit 3 (75% predicted probability), digit 2 (10% predicted probability), and digit 1 (10% predicted probability). In another example, post-processing 440 may retain any class with a prediction value exceeding a predefined threshold (e.g., 60% or 80%). Many other examples of ranking methods are also possible. In line with the discussion above, ranking methods can also be applied to single, aggregate vectors determined by weighting methods.

After post-processing 440 of the output(s) of predictive model 360 is complete, ML pipeline 400 can proceed to provide predictive model output(s) 370. ML pipeline 400 can provide predictive model output(s) 370 by storing some or all of predictive model output(s) 370, communicating some or all of predictive model output(s) 370 to one or more other computing devices, displaying some or all of predictive model output(s) 370, and/or otherwise furnish some or all of predictive model output(s) 370 as outputs.

In some examples, specific hardware can be built to embody part or all of predictive model 360 and/or ML pipeline 400. For example, the specific hardware representing predictive model 360 and/or ML pipeline 400 can be embodied as neural network software 212 executed by embedded vision processors 214.

IV. EXAMPLE GLOBAL IMAGES AND LOCAL IMAGES

As previously described, the herein described techniques and apparatuses provide for a machine learning (ML) system that can quickly predict quality issues and/or printer engine defects and provide recommendations to resolve the quality issues and/or printer engine defects.

Accordingly, to detect a wide range of quality issues and/or printer engine defects, the embodiments herein may rely on the use of global images (i.e., images that capture the entirety of an original image) and local images (i.e., images that capture a portion of an original image).

Figure 5:
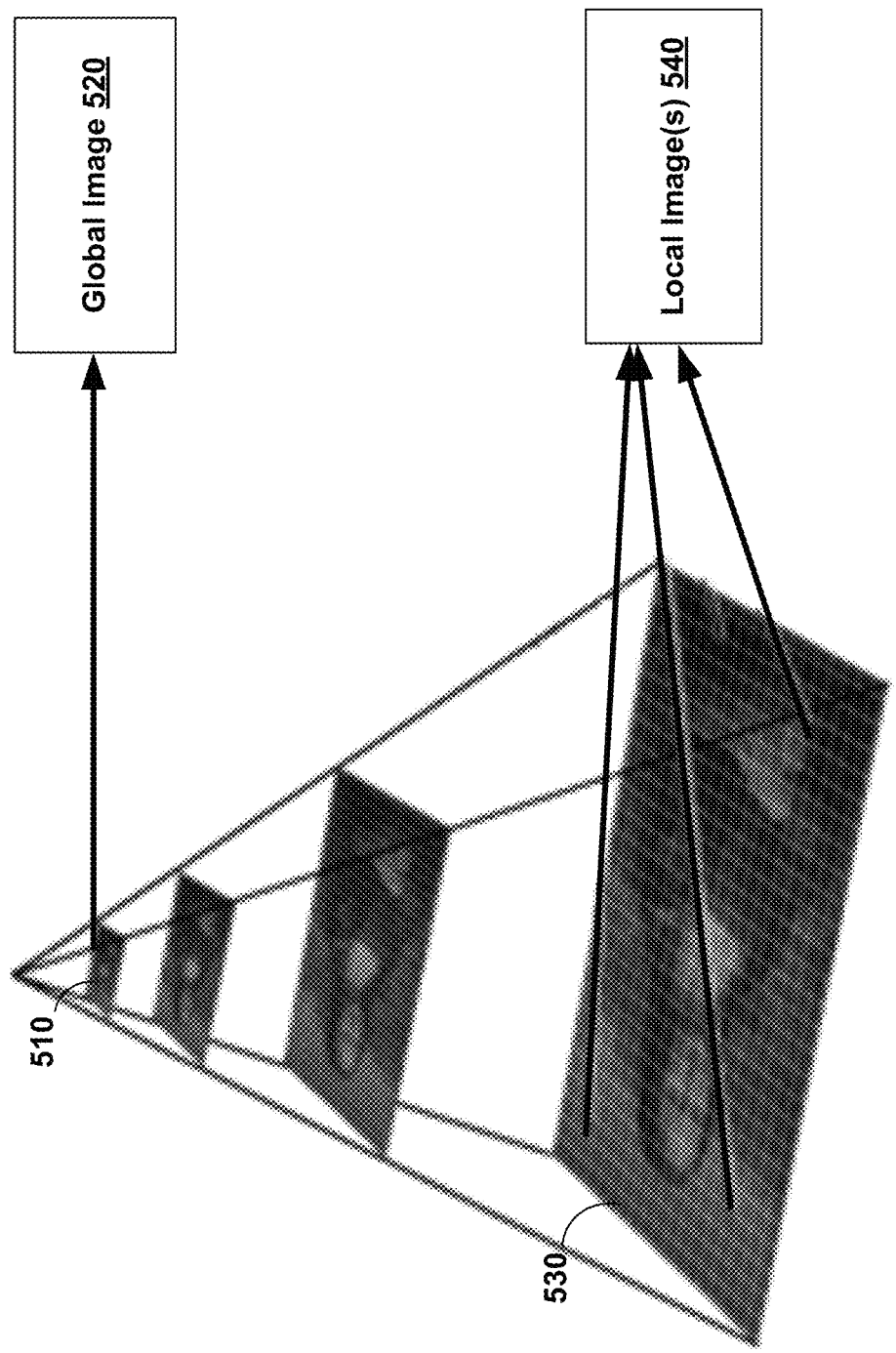
FIG. 5 illustrates global and local images, according to example embodiments.

FIG. 5 illustrates global image 520 and local images 540, according to example embodiments. In line with the discussion above, both global image 520 and local image(s) 540 may be part of a training dataset (e.g., training input 320) used to train one or more machine learning algorithms (e.g., machine learning algorithm 340) and/or may be part of input data (e.g., actual input 350) provided to one or more machine learning models (e.g., predictive model 360).

To obtain global image 520, a computing device can take original image 530 and create a thumbnail image 510 that captures the entirety of original image 530. Various scaling methods can be used to determine thumbnail image 510 from original image 530. For example, the scaling methods can include edge-directed interpolation algorithms, Fourier-based interpolation algorithms, vectorization, or other similar scaling algorithms. In some cases, the thumbnail image 510 can be further down-sampled and scaled to match the dimensions of local image(s) 540.

To obtain local image(s) 540, a computing device can perform scanning operations on the original image 530. For example, the computing device can apply a linear, grid-scan over the entirety of original image 530. This linear, grid-scan can involve taking horizontal and vertical steps across original image 530 based on a fixed local image size. For example, suppose original image 530 is 150×100 pixels and the fixed local image size is 30×20 pixels. Then, each horizontal step can be 30 pixels and each vertical step can be 20 pixels, leading to 25 local images of size 30×20 pixels that cover the 150×100 pixels of original image 530 In other cases, local image(s) 540 can be obtained through a random selection of regions of original image 530. For example, N (e.g., N=3, 4, 5, etc.) randomly selected regions of original image 530, each region equal to a fixed local image size, can be captured.

Additionally and/or alternatively, local image(s) 540 can be obtained from a user of a printing device. For example, a printing device can contain a user interface, in which a graphical display of original image 530 can be shown. A user can then interact with the user interface to select areas of original image 530 in which quality issues and/or defects are visibly present. These selected areas can then be translated by the user interface into local image(s) 540 associated with original image 530. In cases where the selected areas do not match a fixed local image size, the selected areas can be cropped, sampled, subdivided, and/or otherwise modified to fit the fixed local image size.

In some examples, both global image 520 and local image(s) 540 can be scaled to have equivalent dimensions. In some examples, the dimensions of global image 520 and/or local image(s) 540 can be based on the factors related to a machine learning model that global image 520 and/or local image(s) 540 are being trained on. For example, suppose that global image 520 and/or local image(s) 540 are used to train a CNN model. If the CNN model's architecture has a high throughput rate, global image 520 and/or local image(s) 540 may have large dimensions (e.g., 1500×1500 pixels), as the CNN model may be able to process large dimensional images without forfeiting training speed. As another example, if the CNN model's architecture has high density connections (e.g., many fully connected layers), global image 520 and/or local image(s) 540 may have small dimensions (e.g., 500×500 pixels), as the CNN model may have to forfeit training speed if the training images have large dimensions. Other factors, such as the number of layers or the size of the CNN model, can also be used in determining image dimensions.

In some examples, the quantity of global image 520 and/or local image(s) 540 obtained from original image 530 can be based on the factors related to original image 530. For example, suppose that original image 530 includes a color plane offset defect. Since color plane offset defects can be fairly small (e.g., the defect may only appear on 1-3 pixels of original image 530), only local image(s) 540 might be obtained to detect color plane offset defects. As another example, suppose that original image 530 includes a Moiré pattern defect. Since Moiré pattern defects can be fairly large (e.g., the defect may only appear on a large image patch because pattern regularity has to be detected), only global image might be obtained to detect Moiré pattern defects.

V. EXAMPLE TECHNIQUES AND DEVICES FOR DEFECT DETECTION

Figure 6A:
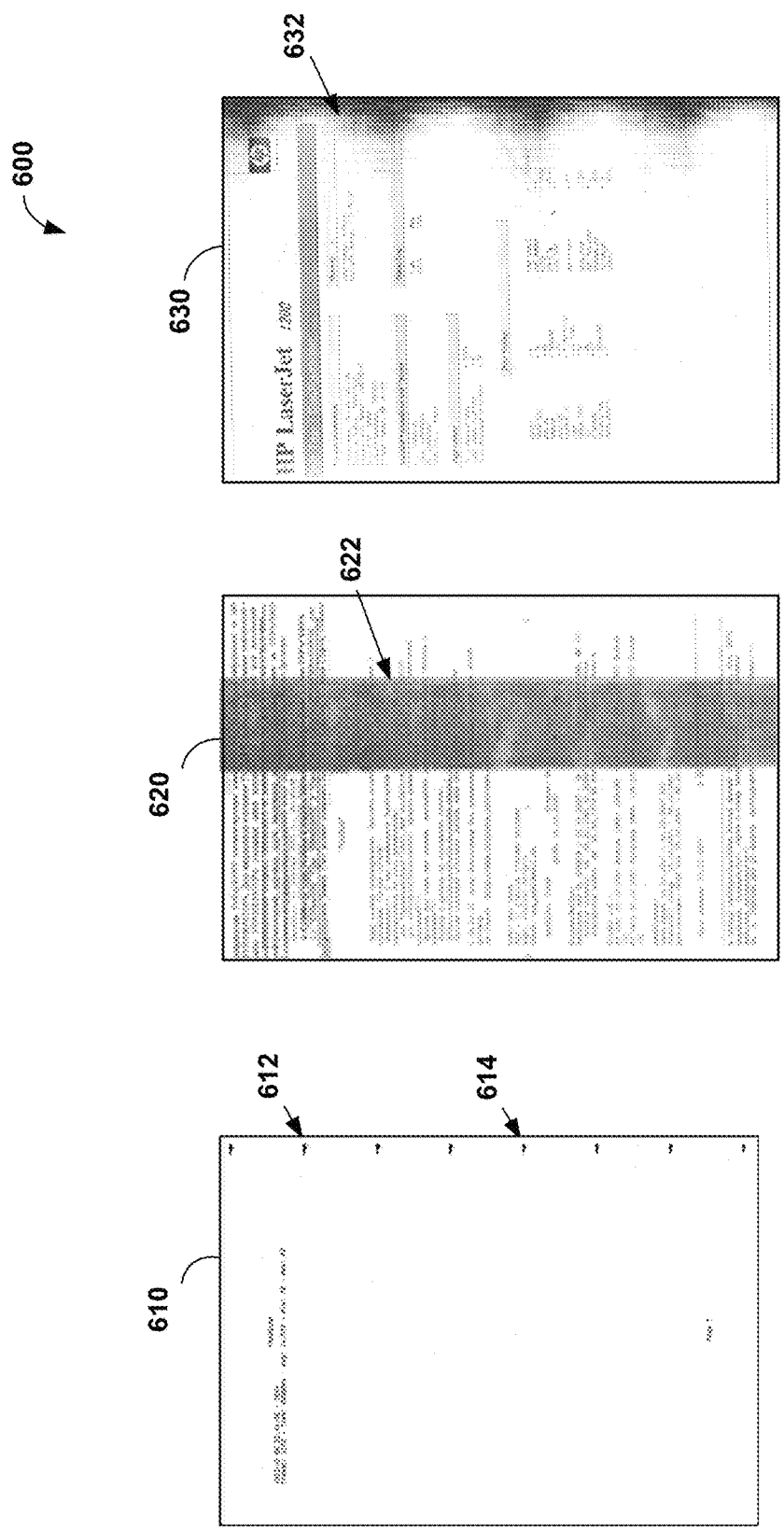
FIGS. 6A and 6B illustrate images associated with printer engine defects, according to example embodiments.
Figure 6B:
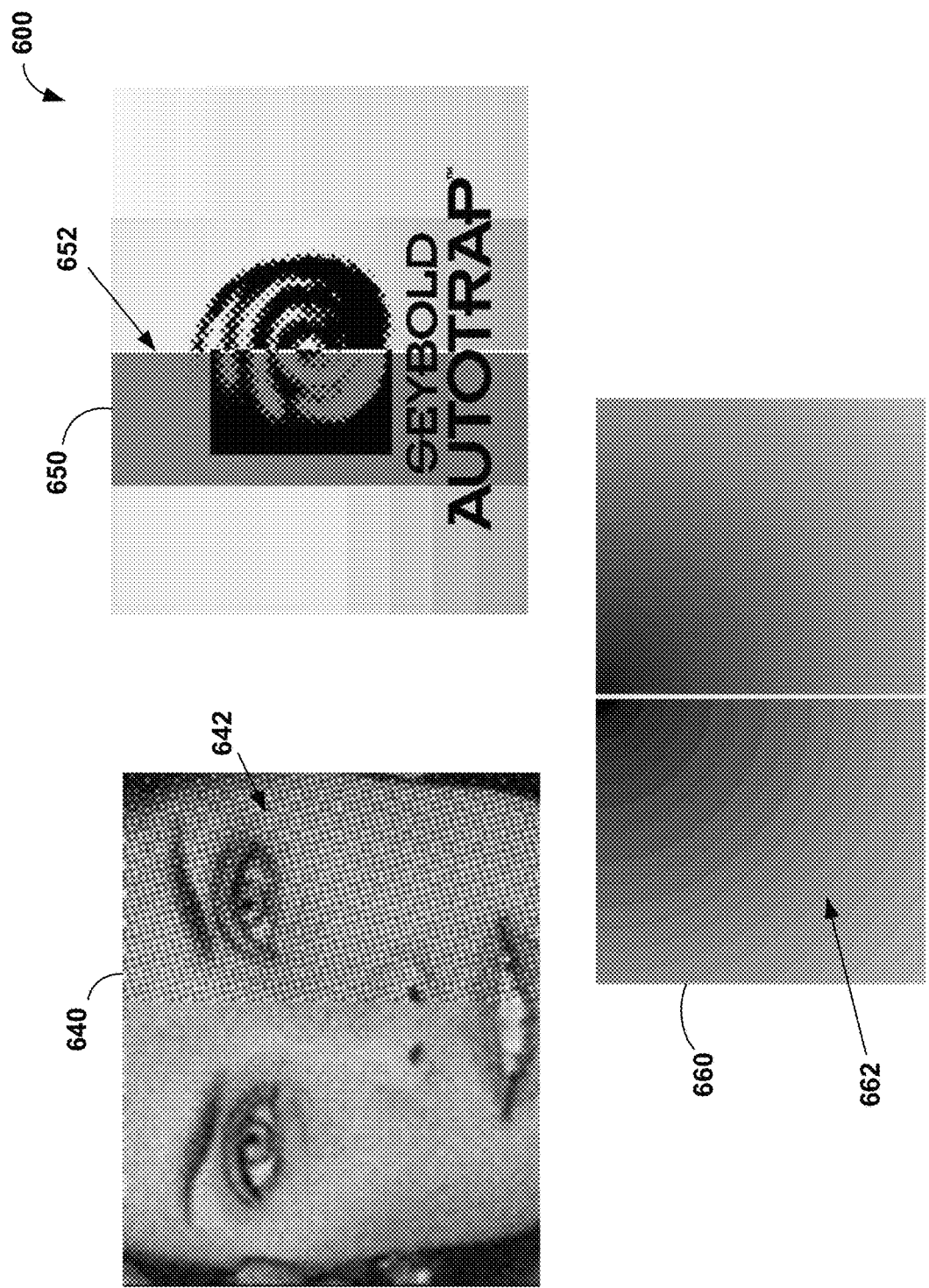

FIGS. 6A and 6B illustrate images 600 that exhibit known deformities associated with printer engine defects, in accordance with example embodiments. Images 600 include image 610, image 620, image 630, image 640, image 650, and image 660.

Image 610 is an image that may result from a toner defect. This toner defect can be illustrated by the right side of image 610 as a series of black spots, such as spot 612 and spot 614. Spots 612, 614 on image 610 can result, for example, if a roller on the printer engine that printed image 610 is coated with toner. One solution to resolve this toner defect can be removing toner from the roller.

Image 620 is another image that may result from a toner defect. This toner defect can be illustrated at the center of image 620, which exhibits a long black streak 622. Streak 622 on image 620 can result, for example, if the toner hopper on the printing device that printed image 620 is full. One solution to resolve this toner defect can be emptying the toner hopper.

Image 630 is an image that may result from a drum defect. A drum defect can be illustrated by the right side of image 630, which is shown to exhibit a large black streak 632. The Streak 632 on image 630 can result, for example, from a loss of photosensitive coating of the drum on the printing device that printed image 630. One solution to resolve the drum defect can be ordering and replacing the drum.

Image 640 is an image that may result from a halftone defect. A halftone defect can be illustrated by the right side of image 640, which exhibits minute microdots (e.g., a Moire pattern), such as microdots 642. Microdots 642 on image 640 can result, for example, from micro-structures interfering with the halftone of a printing device that printed image 640. One solution to resolve the halftone defect can be switching the printer engine to a FM halftone screen.

Image 650 is an image that may result from a color plane defect. A color plane defect can be illustrated by the center of image 650, which exhibits a white gap 652. White gap 652 on image 650 can result, for example, from a color plane offset on a printing device that printed image 650. One solution to resolve the color plane defect can be boosting the trapping width setting of the printer engine.

Image 660 is an image that may result from a tonal defect. A tonal defect can be illustrated by the left side of image 660, which exhibits gradient contour lines, such as gradient contour line 662. Gradient contour line 662 can image 660 can result, for example, from a bad tonal response of a printing device that printed image 660. One solution to resolve the tonal defect can be re-calibrating the printer engine. Other solutions to the defects shown in images 610, 620, 630, 640, 650, and/or 660 are possible as well. It should be noted that other printer engine defects besides the defects discussed in the context of FIGS. 6A and 6B are also possible.

To quickly resolve the printer engine defects associated with images 600, a printing device can be configured with a machine learning system that can automatically predict and resolve printer engine defects. To successfully train such a machine learning system, multiple images that exhibit deformities associated with printer engine defects (for example images 610, 620, 630, 640, 650, and 660) can be provided along with "normal images" or images that do not exhibit such deformities as training data.

Figure 7:
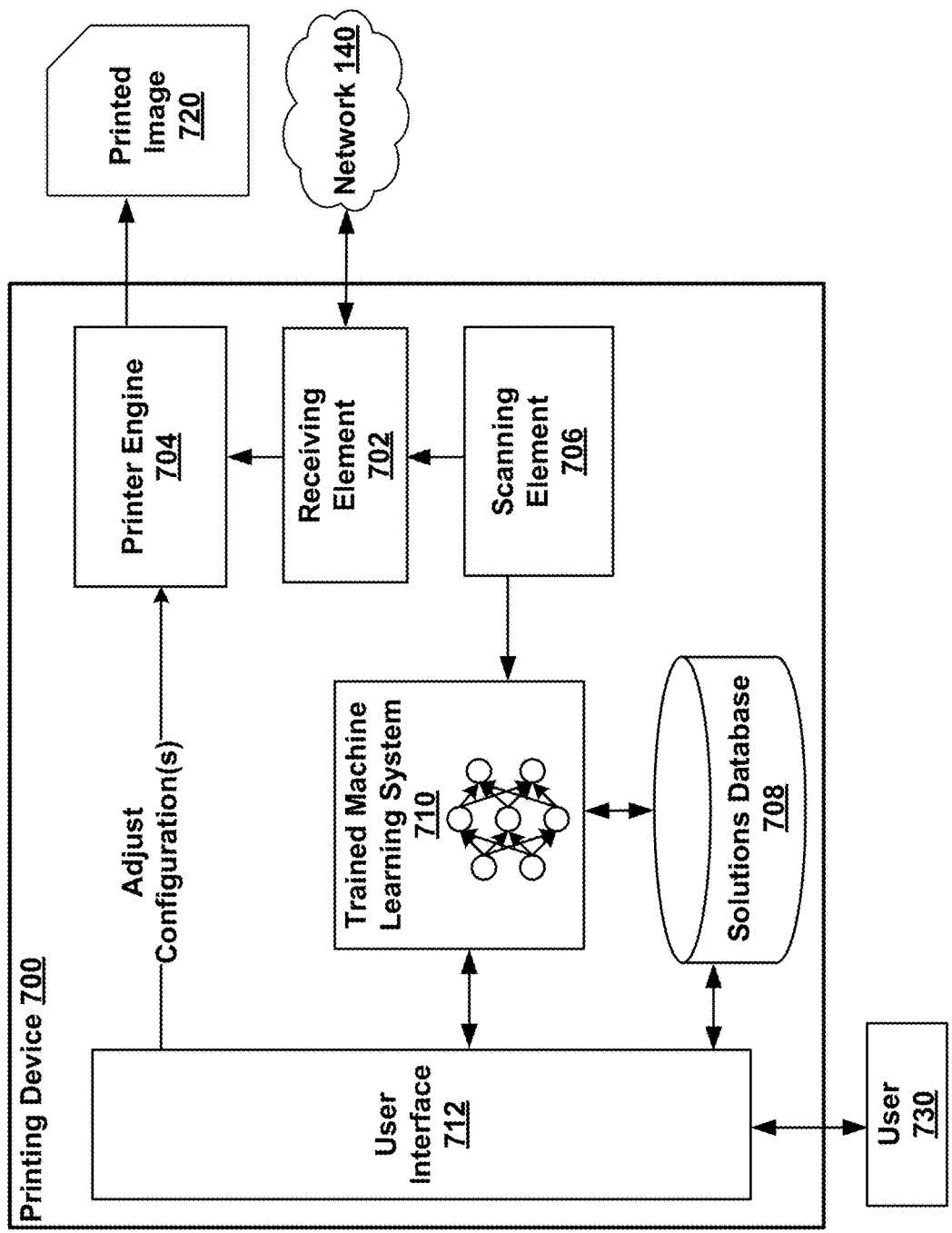
FIG. 7 is a block diagram of a printing device, according to example embodiments.

FIG. 7 is a diagram illustrating printing device 700, according to an example embodiment. Printing device 700 may be configured to print partially-stored and/or fully-stored electronic images on various types of physical output media, for example, printed image 720. These output media include, but are not limited to, various sizes and types of paper, overhead transparencies, and so on. Printing device 700 may be interchangeably referred to as a "printer."

Printing device 700 may serve as local peripheral to a computing device, such as computing device 200, a printing device, a printing network, a personal computer, a server device, a print server, etc. In these cases, printing device 700 may be attached to the computing device by cable, such as a serial port cable, parallel port cable, Universal Serial Bus (USB) cable, Firewire (IEEE 1394) cable, or High-Definition Multimedia Interface (HDMI) cable. Thus, the computing device may serve as a source of electronic images for printing device 700.

On the other hand, printing device 700 may include a wireline or wireless network interface, such as an Ethernet or 802.11 (e.g., Wi-Fi™.) interface, to allow printing device to communicate with a network, such as network 140. So arranged, printing device 700 may serve as a printing device for any number of computing devices that can communicate with printing device 700 over network 140. In some embodiments, printing device 700 may serve as both a local peripheral and a networked printer at the same time.

In order to use printing device 700, computing devices may install one or more printer drivers. These printer drivers may include software components that convert the electronic images to be printed from various local representations stored on the computing devices to one or more representations supported by printing device 700.

Regardless, printing device 700 may be considered to be a non-generic type of computing device, and may carry out both printing-related and non-printing related tasks. For instance, printing device 700 may also include copier, fax, and scanner functions. In some embodiments, printing device 700 may use a scanning unit to facilitate copier and/or fax functions. For instance, printing device 700 may scan physical images into an electronic format, and then print the resulting electronic images to provide a copy, and/or transmit the resulting electronic images via a telephone interface to provide a fax operation. Additionally, printing device 700 may be able to receive a faxed electronic image via a telephone interface, store a representation of this electronic image, and print it out.

In order to support various capabilities as described herein, printing device 700 may include receiving element 702, printer engine 704, scanning element 706, solutions database 708, machine learning system 710, and user interface 712. In some examples, printing device 700 can have more, fewer, and/or different types of components than indicated in FIG. 7. For instance, printing device 700 include all or some or the components and/or properties of computing device 200.

Receiving element 702 can include one or more computing devices, hardware, firmware, or a software application configured to receive copy/print requests and cause a representation of an electronic image corresponding to the copy/print requests to be rendered on a portable medium. Receiving element 702 can have multiple possible data paths through which the representation of an electronic image can be received. In one example, a user can instruct printing device 700 to copy a physical image. In response to this instruction, scanning element 706 may scan the physical image into an electronic image, and transmit the electronic image to receiving element 702, which may temporarily storing some or all of the electronic image (possibly in a compressed format) in the data storage of printing device 700. Then, receiving element 702 may transmit the electronic image to printer engine 704 to print to physical media (e.g., one or more sheets of paper). As another example, a user can instruct a computing device on network 140 to print an electronic image on printing device 700. In response to this instruction, receiving element 702 may receive from the computing device on network 140 a representation of the electronic image. Then, receiving element 702 may transmit the electronic image to printer engine 704 to print the electronic image to physical media; e.g., paper. Some, or all, of the electronic image may be stored by receiving element 702 (possibly in a compressed format) in the data storage of printing device 700 before and/or during the printing of the electronic image.

Printer engine 704 can include a print head, one or more ink cartridges, and a paper feed assembly (i.e. an inkjet printer). Alternatively, the printer engine 704 may include a laser printer assembly, having a laser scanning unit, photoreceptor drum, toner hopper, fuser, and developer roller (i.e., a laser printer). Printer engine 704 can be communicatively coupled to receive representations of electronic images from receiving element 702.

Scanning element 706 may be a glass panel below which a movable light source operates to scan physical media placed on top of the glass panel. Alternatively, a digital camera below the glass panel may "scan" the physical media placed on top of the glass panel by taking a picture of the physical media. Images of scanned physical media may be stored as images in data storage associated with printing device 700. In some embodiments, the glass panel may be replaced with any type of transparent panel. In example embodiments, scanning element 706 can be a component of the printing device 700, for example, providing one function of a multifunction printing (MFP) device. As used herein, an MFP device is any printing device that, in addition to printing, can perform at least one other function such as scanning, copying, or faxing. Alternatively, scanning element 706 may take the form of a scanning device physically separate from printing device 700. In some examples, the scanning element 706 can take the form of a stand-alone or integrated scanner, digital camera, barcode scanner, or other electronic device that can read an image.

Solutions database 708 can include one or more computing devices, hardware, firmware, or a software application configured to store data. For example, solutions database 708 may include one or more files, in-memory databases, caches, relational databases (e.g., SQL), graph databases (e.g., neo4j), document databases (e.g., MongoDB), column databases (e.g., Cassandra) and/or other data storage mechanisms. Solutions database 708 may store records associated with solutions to known printer engine defects. That is, solutions database 708 can contain mappings between predicted printer engine defects and potential repairs to resolve those printer engine defects. For example, given a predicted toner defect, solutions database 708 can contain instructions for emptying the toner hopper of the printer engine.

In some cases, solutions database 708 may act as data storage for components of trained machine learning system 710. For instance, solutions database 708 may be configured to store one or more trained models (e.g., learned parameters) of trained machine learning system 710 and provide the one or more trained models to trained machine learning system 710 upon request. In some cases, solutions database 708 may take the form of a database physically separate from printing device 700. For example, solutions database 708 can take the form of a stand-alone or integrated database on network 140.

Trained machine learning system 710 can include one or more trained machine learning models configured to receive images printed by printing device 700 and make predictions about one or more printer engine defects associated with printing device 700. In example embodiments, trained machine learning system 710 can take on some or all of at least the functionality described in the context of an artificial neural network, a convolutional neural network, and pipelines 300, 400. For instance, trained machine learning system 710 can take on some or all of at least the functionality described in the context of predictive model 360. In examples, trained machine learning system 710 can be applied at run-time to predict or infer a prediction based on the real-time data received from scanning element 706. As described herein, the predicted could trigger, prompt, or initiate various events such as a notification, a report, an order, or another type of action.

In some examples, trained machine learning system 710 can be embedded as part of neural network software 212 and executed by embedded vision processor 214. In some examples, trained machine learning system 710 can be updated or otherwise reprogrammed, for example via connections with network 140, to provide different neural-network-related and/or machine-learning-algorithm-related functionality. In some examples, trained machine learning system 710 can be included in a computing device physically separate from printing device 700. For example, trained machine learning system 710 can be included in a stand-alone computing on network 140.

User interface 712 may facilitate the interaction of printing device 700 with a human or non-human user, for example user 730, such as to receive input from the user and to provide output to the user. Thus, user interface 712 may include input components such as a keypad, keyboard, touch-sensitive or presence-sensitive panel, joystick, microphone, still camera and/or video camera. User interface 712 may also include one or more output components such as a display screen (which, for example, may be combined with a presence-sensitive panel), a cathode ray tube (CRT), a liquid crystal display (LCD), a light emitting diode (LED) based display, a display using digital light processing (DLP®) technology, a light bulb, and/or one or more other similar devices, now known or later developed. User interface 712 may also be configured to be able to generate audible output(s), via a speaker, speaker jack, audio output port, audio output device, earphones, and/or other similar devices, now known or later developed in the future.

Figure 8:
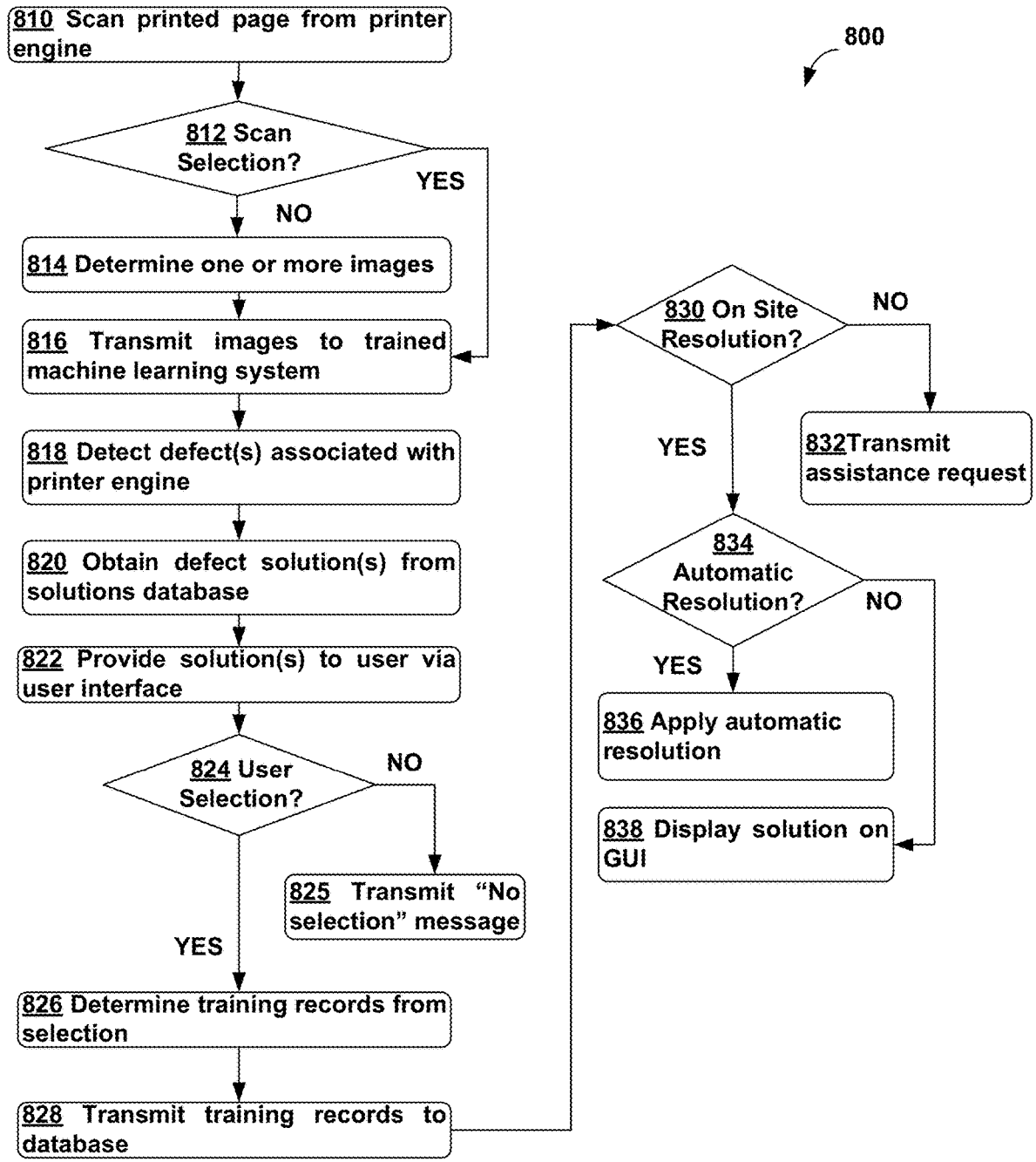
FIG. 8 is a flowchart of a method for resolving potential defects associated with a printer engine, according to example embodiments.

FIG. 8 is a flow chart of illustrating method 800, according to example embodiments. Method 800 is a method for resolving potential defects associated with a printer engine. Method 800 can be carried out at least by computing device 200, devices on computing network 140, and/or the components of printing device 700. Notably, method 800 may be simplified by the removal of any one or more of the blocks shown therein. Further, the blocks of method 800 may be combined with features, aspects, and/or implementations of any of the previous figures or otherwise described herein.

Method 800 can begin at block 810, when printed image 720 (i.e., an image printed by printing device 700) is scanned into printing device 700 using scanning element 706. In some examples, block 810 can be initiated by user 730. For example, user 730 can notice some unpleasant defects on printed image 720. And in order to discover the source of the defects, user 730 can start a "defect diagnostic function" via user interface 712 of printing device 700. Then, user 730 can scan printed image 720 into printing device 700. Printed image 720 may be interchangeably referred to as a "printed page."

Upon receiving the scanned image, printing device 700 can display the scanned image on user interface 712. For example, the scanned image can be displayed on a sensitive display screen, such as a touch screen interface. As previously described in FIG. 5, user 730 can interact with user interface 712 to select areas of the scanned image where defects are visibly present. The selected areas (e.g., scanning selections) can then be translated by printing device 700 into local image(s) associated with the scanned image. As such, at block 812, printing device 700 can determine whether any scanning selections are provided by user 730. If scanning selections are provided, method 800 can continue to block 816. Otherwise, method 800 can continue to block 814.

Given that no selections were provided by user 730, at block 814 printing device 700 can determine a global image and/or one or more local images with respect to the scanned image. As described in FIG. 5, to obtain the global image, printing device 700 can create a thumbnail that captures the entirety of scanned image. And to obtain local image(s), printing device 700 can perform scanning operations (e.g., perform linear, grid-scan and/or random scans) on the scanned image. The numbers of global and/or local images can vary depending on the configuration of printing device 700. In one example, 1 global image and 3 local images can be determined. In another example, 2 global images can be determined. In yet another example, 10 local images can be determined. Other examples are also possible.

At block 816, the images determined from block 812 (i.e., images determined by the scanning selection) or the images determined from block 814 (i.e., the global image and one or more local images determined by printing device 700) can be communicated to trained machine learning system 710 to make predictions regarding defect(s) associated with printer engine 704. And at block 818, trained machine learning system 710 can apply one or more trained machine learning models on the determined images to predict defects associated with printer engine 704. In examples, the one or more trained machine learning models can take the form of CNN model(s) 420.

In some examples, CNN models(s) 420 can contain a CNN trained on local images (referred to herein as the local CNN) and another CNN trained on global images (referred to herein as the global CNN). Specifically, the local CNN can be utilized to predict printer engine defects via local images, whereas the global CNN can be utilized to predict printer engine defects via global images. Accordingly, at block 818, global images can be provided to the global CNN and local images can be provided to the local CNN.

In other examples, CNN model(s) 420 can contain a single CNN trained with both global images and local images. Specifically, the single CNN can be utilized to predict printer engine defect(s) via both local and global images. When using the single CNN, printing device 700 can be configured to scale global images and local images to have equivalent dimensions.

At block 818 trained machine learning system 710 may utilize post-processing techniques, such as techniques described with respect to post-processing 440, to produce a prediction regarding defect(s) associated with printer engine 704. At block 820, printing device 700 can retrieve one or more solutions to resolve the predicted defect(s) from solutions database 820 based on the prediction regarding defect(s) of block 818. In an example implementation of blocks 818 and 820, CNN model(s) 420 may produce a prediction vector of size N, where N could be the number of possible printer engine defect(s) known to printing device 700. Then, post-processing 440 can take the prediction vector as input and may reduce the possible predictions from N to smaller subset. In some cases, the subset could be of size 1, where 1 predicted printer engine defects is outputted by trained machine learning system 710. In other cases, the subset could be of size 5, where 5 predicted printer engine defects are outputted by trained machine learning system 710. Regardless, printing device 700 may retrieve, from solutions database 820, one or more solutions to resolve the outputted predicted defect(s).

At block 822, the predicted printer engine defect(s) and the one or more solutions to resolve the predicted printer engine defect(s) can be provided to user 730 via user interface 712. In examples, the predicted printer engine defect(s) and the one or more solutions can take the form of a prompt, a notification, a report, an order, or another type of electronic representation on user interface 712. Additionally, the electronic representation may include one or more user selectable options that allow users to take further actions. In some examples, the predicted printer engine defect(s) can include a confidence value and/or other data related to accuracy of the prediction. The confidence value can be determined by trained machine learning system 710. For example, a confidence value in the range of 0 to 100 can be determined for (and perhaps output with) a predicted printer engine defect, where a confidence value of 0 would indicate that trained machine learning system 710 had no (0%) confidence in the prediction, where a confidence value of 100 would indicate that trained machine learning system 710 have certain (100%) confidence in the prediction, and where a value between 0 and 100 would indicate a percentage confidence in the prediction. Other techniques are also possible.

At block 824, printing device 700 can determine whether user 730 has selected or otherwise chosen a solution of the one or more solutions provided via user interface 712. If a solution has been selected or otherwise chosen, method 800 can continue to block 826. Otherwise, method 800 can continue to block 825.

At block 825, printing device 700 can be notified, perhaps by user interface 712, that no solution has selected by user 730. This can result, for example, from user 730 choosing not to pursue any of the suggested repairs to resolve the predicted printer engine defect. At this point, method 800 may terminate, or perhaps return back to block 810 to wait for another printed image to be scanned by user 730.

At block 826, upon receiving a selected solution from user 730, printing device 700 may record the selected solution as a new training record for trained machine learning system 710. More specifically, the selected solution may be used as a ground truth value, while the scanned image may be used as training input (e.g., feature vector). And at block 828, printing device 700 can communicate the new training record to trained machine learning system 710 or to data storage containing training records used to train trained machine learning system 710, perhaps data storage on network 140. In some examples, the trained machine learning system 710 can be configured to retrain, based on the new training records, one or more trained machine learning models. It should be noted that in method 800, blocks 826 and 828 can be omitted and/or blocks 826 and 828 can be carried out in parallel with other aspects of method 800.

At block 830, printing device 700 can identify whether the selected solution involves onsite resolution. As used herein, onsite resolution can refer to any solution to resolve a printer engine defect which can be accomplished without the aid of entities physically distant from printing device 700. If the selected solution involves onsite resolution, method 800 can continue to block 834. Otherwise, method 800 can continue to block 832.

At block 832, printing device 700 can transmit a remote assistance request. The request can comprise information about printing device 700, printer engine 704, the predicted defect associated with printer engine 704, and the selected solution. In one example, the remote assistance request can be transmitted to a manufacturer of printing device 700. In another example, the remote assistance request can be transmitted to a vendor of components of printing device 700, for example, to order and replace parts of printer engine 704.

At block 834, printing device 700 can identify whether the selected solution involves automatic resolution. As used herein, automatic resolution can refer to any solution to resolve a printer engine defect which can be accomplished programmatically. In some examples, a solution involving automatic resolution can avoid physical interaction with printing device 700. In examples, identifying whether the selected solution can be accomplished programmatically can involve searching for available patches or bug fixes for printer engine 704 based on a firmware level of printer engine 704. As such, if the selected solution involves automatic resolution, method 800 can continue to block 836. Otherwise, method 800 can continue to block 838.

At block 836, printing device 700 can programmatically apply the selected solution involving automatic resolution to the printer engine. For example, printing device 700 can automatically download and install an available software patch that changes one or more settings (e.g., a trapper width setting) of the printer engine. As another example, printing device 700 can automatically switch the printer engine 704 to use a FM halftone screen. Many other solutions involving automatic resolution are possible as well.

At block 838, printing device 700, upon detecting the selected solution does not involve automatic resolution, can display the selected solution on user interface 712. Block 838 can be carried out, for example, if user 730 is to accomplish an action to resolve the printer engine defect. For example, user 730 can be provided with information on how to wipe toner off the roller of printer engine 704.

FIG. 9 shows a flowchart for a method 900, according to an example embodiment. Method 900 can be executed by one or more processors of a printing device, such as printing device 700. Method 900 can begin at block 910, where the printing device can receive one or more images associated with a printed page, the printed page printed by a printer engine of the printing device, such as discussed herein at least in the context of FIGS. 7 and 8.

At block 920, the printing device can provide, to a trained machine learning system, the one or more images, the trained machine learning system comprising one or more trained convolutional neural networks (CNNs) configured to receive an image depicting at least a portion of a page printed by the printer engine and to provide one or more outputs related to potential defects associated with the printer engine, such as discussed herein at least in the context of FIGS. 3, 4, 6, 7, and 8.

At block 930, the printing device can obtain, from the trained machine learning system, one or more outputs indicating at least one potential defect associated with the printer engine, such as discussed herein at least in the context of FIGS. 3, 4, 6, 7, and 8.

At block 940, the printing device can determine, using a solutions database, whether one or more solutions resolve the at least one potential defect associated with the printer engine are available, such as discussed herein at least in the context of FIGS. 7 and 8.

At block 950, the printing device can, after determining that the one or more solutions to resolve the least one potential defect are available, provide, by way of a graphical interface, information about the one or more solutions, such as discussed herein at least in the context of FIGS. 4, 7, and 8.

In some examples, the printing device can receive, by the graphical interface, a selected solution from the one or more solutions, identify whether the selected solution involves remote assistance, and after identifying that the selected solution involves remote assistance, transmit a remote assistance request comprising information about the printer engine and the at least one potential defect associated with the printer engine, such as discussed herein at least in the context of FIGS. 7 and 8.

In some examples, after identifying that the selected solution does not involve remote assistance, the printing device can provide, by the graphical interface, information for adjusting one or more parameters of the printing engine to resolve the at least one potential defect, such as discussed herein at least in the context of FIGS. 7 and 8.

In some examples, the printing device can receive, by the graphical interface, a selected solution from the one or more solutions, identify whether the selected solution is programmatically applicable to the printer engine, and after identifying that the selected solution is programmatically applicable, apply one or more executable instructions associated with the selected solution to the printer engine, such as discussed herein at least in the context of FIGS. 7 and 8.

In some examples, identifying whether the selected solution is programmatically applicable to the printer engine comprises searching for, based on a firmware level of the printer engine, available patches or bug fixes for the printer engine, such as discussed herein at least in the context of FIGS. 7 and 8.

In some examples, receiving the one or more images associated with the printed page can comprise scanning, at a scanning device of the printing device, the printed page and converting, at the scanning device, the printed page into the one or more images, such as discussed herein at least in the context of FIGS. 7 and 8.

In some examples, receiving the one or more images associated with the printed page can comprise identifying, by the graphical interface, one or more regions on the printed page, the one or more images comprising images of each of the one or more regions, such as discussed herein at least in the context of FIGS. 5, 7 and 8.

In some examples, the printing device can receive, from the graphical interface, a selected solution from the one or more solutions, record the selected solution, determine new training records for the trained machine learning system based on the selected solution and transmit, to the trained machine learning system, the new training records, where the trained machine learning system is configured to retrain, based on the new training records, the one or more trained CNNs, such as discussed herein at least in the context of FIGS. 4, 5, 7 and 8.

In some examples, obtaining one or more outputs indicating at least one potential defect associated with the printer engine can comprise the trained machine learning system detecting at least one of a Moire pattern, a white gap pattern, or a gradient contour pattern, such as discussed herein at least in the context of FIGS. 6A, 6B, 7 and 8.

In some examples, the one or more images comprise a global image that depicts substantially all of the printed page, and providing the one or more images to the trained machine learning system comprises applying the one or more trained CNNs to each of the one or more images by associating an image of the one or more images as the global image, after associating the image of the one or more images as the global image, selecting a trained CNN of the one or more trained CNNs that is associated with the global image, and using the selected trained CNN that is associated with the global image, such as discussed herein at least in the context of FIGS. 3, 4, 5, 7 and 8.

In some examples, the one or more images comprise a local image that depicts a portion of the printed page, and providing the one or more images to the trained machine learning system comprises applying the one or more trained CNNs to each of the one or more images by associating an image of the one or more images as the local image, after associating the image of the one or more images as the local image, selecting a trained CNN of the one or more trained CNNs that is associated with the local image, and using the selected trained CNN that is associated with the local image, such as discussed herein at least in the context of FIGS. 3, 4, 5, 7 and 8.

In some examples, the printing device can scale each of the one or more images to have equivalent dimensions, such as discussed herein at least in the context of FIGS. 5, 7 and 8.

VI. EXAMPLE TECHNIQUES AND DEVICES FOR QUALITY ISSUE RESOLUTION

Figure 10B:
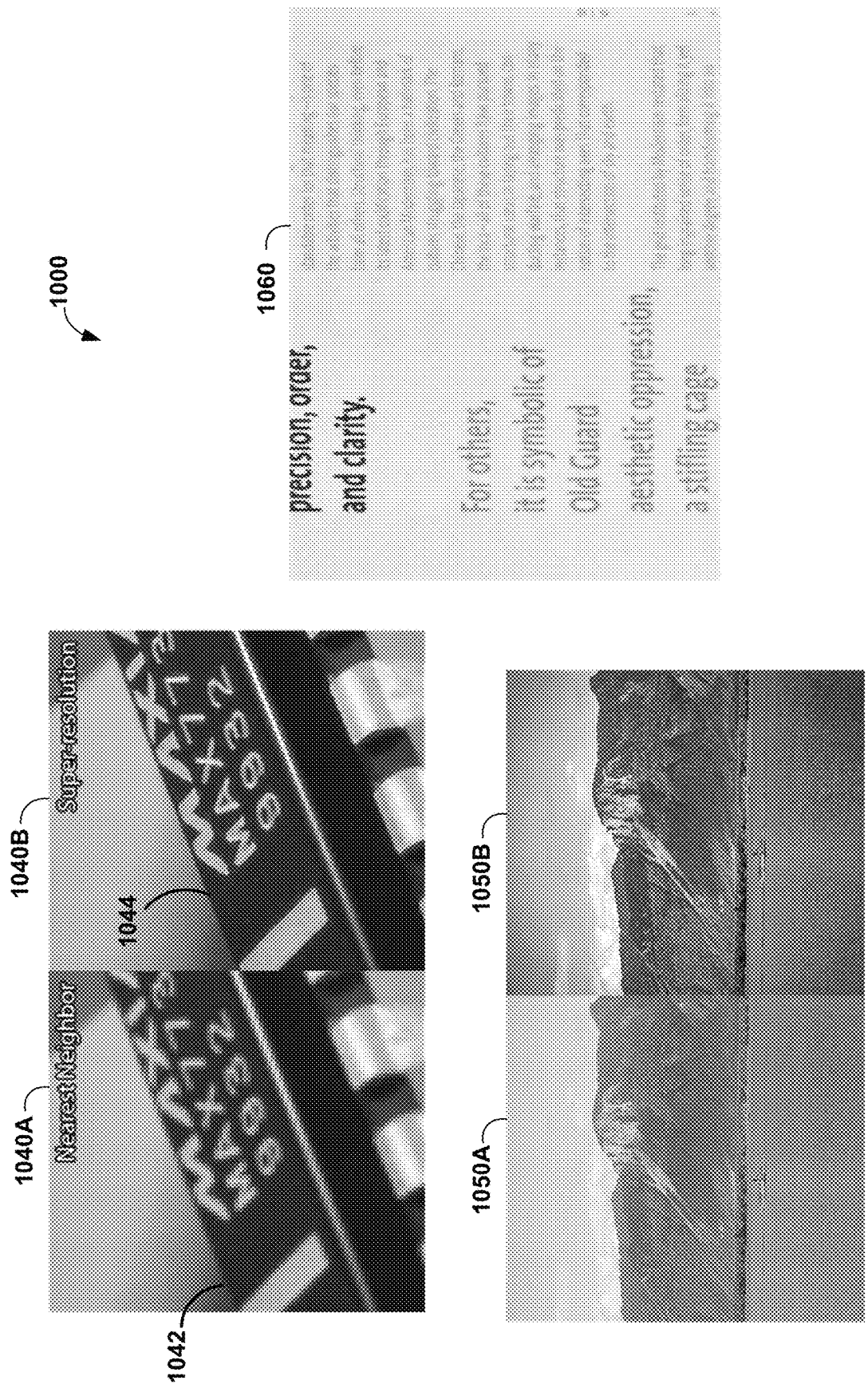

FIGS. 10A and 10B illustrate images 1000 associated with known quality issues, in accordance with example embodiments. Images 1000 include images 1010A and 1010B, images 1020A and 1020B, image 1030, images 1040A and 1040B, images 1050A and 1050B, and image 1060.

Images 1010A and 1010B are images associated with lighting quality issues. Such lighting quality issues can be illustrated by comparing image 1010A, which exhibits a woman photographed under inadequate lighting, to image 1010B, which exhibits the same woman photographed under adequate lighting. As such, a solution to resolve the lighting quality issue illustrated by images 1010A and 1010B can be to increase the overall lighting with a histogram equalization process. Other solutions to resolve lighting quality issues are possible as well.

Images 1020A and 1020B are images associated with salt-and-pepper noise quality issues. Such salt-and-pepper noise quality issues can be illustrated by comparing image 1020A, which exhibits an image of a boat with salt and pepper noise, with image 1020B, which exhibits the same boat with no salt and pepper noise. In particular, region 1022 of image 1020A shows "salt and pepper" or sparsely occurring white and black pixels that take detail and clarity away from the image, where corresponding region 1024 of image 1020B does not have salt and peppers. As such, a solution to resolve the salt-and-pepper noise quality issue can be to reduce the overall noise with a denoising process. Other solutions to resolve salt-and-pepper noise quality issues are possible as well.

Image 1030 is an image associated with a non-uniform illumination quality issue. Such a non-uniform illumination quality issue can be illustrated by comparing the top-right of image 1030, which appears highly illuminated, to the bottom-left of image 1030, which does not appear highly illuminated. As such, a solution to resolve the non-uniform illumination quality issue can be to make the illumination uniform through a histogram equalization process. Other solutions to resolve non-uniform illumination quality issues are possible as well.

Images 1040A and 1040B are images associated with low resolution quality issues. Such low resolution quality issues can be illustrated by comparing image 1040A, which exhibits an image of a device with low resolution, with image 1040B, which exhibits the same device under high resolution. In particular, region 1042 of image 1040A shows "jaggies" or blocky artifacts, where corresponding region 1044 of image 1040B does not have jaggies. As such, a solution to resolve low resolution quality issues can be to increase resolution with a super-resolution process. Other solutions to resolve low resolution quality issues are possible as well.

Images 1050A and 1050B are images associated with haze quality issues. Such haze quality issues can be illustrated by comparing image 1050A, which exhibits an image of a lake with "haze" or a general light obscuration, with image 1050B, which exhibits the same lake with no haze. As such, a solution to resolve the haze quality issue can be to reduce the overall haze with a dehazing process. Other solutions to resolve haze quality issues are possible as well.

Image 1060 is an image associated with a low contrast quality issue. Such a low contrast quality issue can be illustrated by comparing the text at the lower-left and at right of image 1060, which appears faint compared to the text at the top-left of image 1060. As such, a solution to resolve the low contrast quality issue can be to increase image contrast through an edge enhancement process. Other solutions to resolve low contrast issues are possible as well.

To resolve the quality issues discussed above in the context of FIGS. 10A-10B, a printing device can be configured with a machine learning system that can automatically predict and resolve quality issues. To successfully train such a machine learning system, multiple images associated with known quality issues; for example images 1010A, 1020A, 1030, 1040A, 1050A, and 1060 can be provided (along with "normal images") as training data. It should be noted that other quality issues besides those discussed in the context of FIGS. 10A and 10B are also possible.

Figure 11:
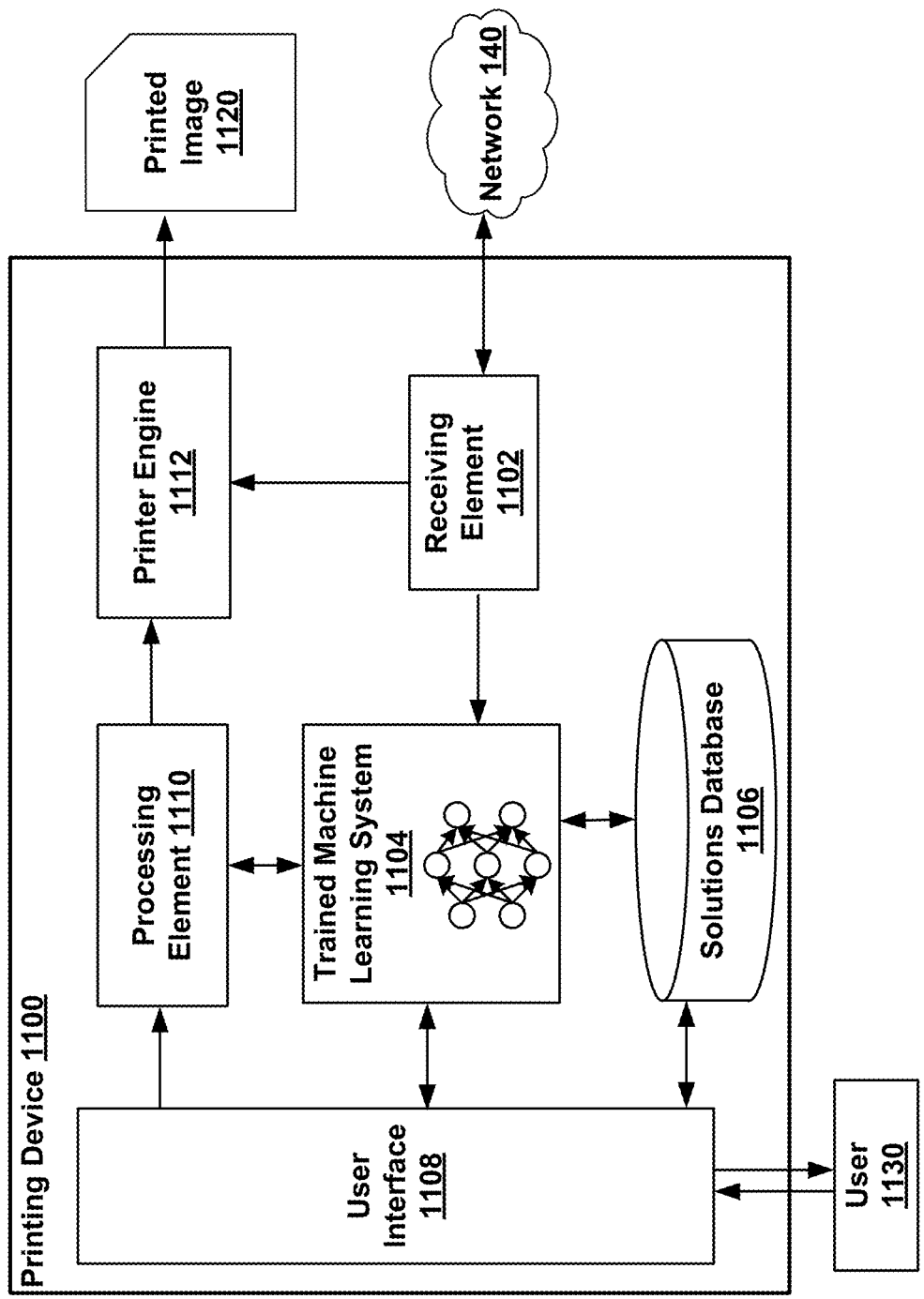
FIG. 11 is a block diagram of a printing device, according to example embodiments.

FIG. 11 is a diagram illustrating printing device 1100, according to an example embodiment. Printing device 1100 may be configured to print partially-stored and/or fully-stored electronic images on various types of physical output media, for example, printed image 1120. These output media include, but are not limited to, various sizes and types of paper, overhead transparencies, and so on. Printing device 1100 may be interchangeably referred to as a "printer."

Printing device 1100 may serve as local peripheral to a computing device, such as computing device 200, a printing device, a printing network, a personal computer, a server device, a print server, etc. In these cases, printing device

1100 may be attached to the computing device by cable, such as a serial port cable, parallel port cable, Universal Serial Bus (USB) cable, Firewire (IEEE 1394) cable, or High-Definition Multimedia Interface (HDMI) cable. Thus, the computing device may serve as a source of electronic images for printing device 1100.

On the other hand, printing device 1100 may include a wireline or wireless network interface, such as an Ethernet or 802.11 (e.g., Wi-Fi™) interface, to allow printing device to communicate with a network, such as network 140. So arranged, printing device 1100 may serve as a printing device for any number of computing devices that can communicate with printing device 1100 over network 140. In some embodiments, printing device 1100 may serve as both a local peripheral and a networked printer at the same time.

In order to use printing device 1100, computing devices may install one or more printer drivers. These printer drivers may include software components that convert the electronic images to be printed from various local representations stored on the computing devices to one or more representations supported by printing device 1100.

Regardless, printing device 1100 may be considered to be a non-generic type of computing device, and may carry out both printing-related and non-printing related tasks. For instance, printing device 1100 may also include copier, fax, and scanner functions. In some embodiments, printing device 1100 may use a scanning unit to facilitate copier and/or fax functions. For instance, printing device 1100 may scan a physical image into an electronic format, and then print the resulting electronic image to provide a copy, and/or transmit the resulting electronic image via a telephone interface to provide a fax operation. Additionally, printing device 1100 may be able to receive a faxed electronic document via a telephone interface, store a representation of this electronic document, and print it out.

In order to support various capabilities as described herein, printing device 1100 may include receiving element 1102, trained machine learning system 1104, solutions database 1106, user interface 1108, processing element 1110, and printer engine 1112. In some examples, printing device 1100 can have more, fewer, and/or different types of components than indicated in FIG. 11. For instance, printing device 1100 include on all or some or the components and/or properties of computing device 200.

Receiving element 1102 can include one or more computing devices, hardware, firmware, or a software application configured to receive copy/print requests and cause a representation of an electronic images corresponding to the copy/print requests to be rendered on a portable medium. Receiving element 1102 can have multiple possible data paths through which the representation of an electronic image can be received. In one example, a user can instruct a computing device on network 140 to print an electronic image on printing device 1100. In response to this instruction, receiving element 1102 may receive from the computing device on network 140 a representation of the electronic image. Then, receiving element 1102 may transmit the electronic image to printer engine 1112 to print the electronic image to physical media; e.g., paper. Some, or all, of the electronic image may be stored by receiving element 1102 (possibly in a compressed format) in the data storage of printing device 1100 before and/or during the printing of the electronic image.

Trained machine learning system 1104 can include one or more trained machine learning models configured to receive images and make predictions about one or more printer engine defects associated with the images. In example embodiments, trained machine learning system 1104 can take on some or all of at least the functionality described in the context of an artificial neural network, a convolutional neural network, and pipelines 300, 400. For instance, trained machine learning system 1104 can take on some or all of at least the functionality described in the context of predictive model 360. In examples, trained machine learning system 1104 can be applied at run-time to predict or infer a prediction based on the real-time data received from receiving element 1102. As described herein, the predicted could trigger, prompt, or initiate various events such as a notification, a report, an order, or another type of action.

In some examples, trained machine learning system 1104 can be embedded as part of neural network software 212 and executed by embedded vision processor 214. In some examples, trained machine learning system 1104 can be updated or otherwise reprogrammed, for example via connections with network 140, to provide different neural-network-related and/or machine-learning-algorithm-related functionality. In some examples, trained machine learning system 1104 can be included in a computing device physically separate from printing device 1100. For example, trained machine learning system 1104 can be included in a stand-alone computing on network 140.

Solutions database 1106 can include one or more computing devices, hardware, firmware, or a software application configured to store data. For example, solutions database 1106 may include one or more files, in-memory databases, caches, relational databases (e.g., SQL), graph databases (e.g., neo4j), document databases (e.g., MongoDB), column databases (e.g., Cassandra) and/or other data storage mechanisms. Solutions database 1106 may store records associated with solutions to known quality issues. That is, solutions database 1106 can contain mappings between predicted quality issues and potential image enhancements to resolve those quality issues. For example, given a source image with a predicted non-uniform illumination quality issue, solutions database 1106 can contain entries for image enhancements, such as increasing illumination, that can be applied on the source image.

In some cases, solutions database 1106 may act as data storage for components of trained machine learning system 1104. For instance, solutions database 1106 may be configured to store one or more trained models (e.g., learned parameters) of trained machine learning system 1104 and provide the one or more trained models to trained machine learning system 1104 upon request. In some cases, solutions database 1106 may take the form of a database physically separate from printing device 1100. For example, solutions database 1106 can take the form of a stand-alone or integrated database on network 140.

User interface 1108 may facilitate the interaction of printing device 1100 with a human or non-human user, for example user 1130, such as to receive input from the user and to provide output to the user. Thus, user interface 1108 may include input components such as a keypad, keyboard, touch-sensitive or presence-sensitive panel, joystick, microphone, still camera and/or video camera. User interface 1108 may also include one or more output components such as a display screen (which, for example, may be combined with a presence-sensitive panel), a cathode ray tube (CRT), a liquid crystal display (LCD), a light emitting diode (LED) based display, a display using digital light processing (DLP®) technology, a light bulb, and/or one or more other similar devices, now known or later developed. User interface 1108 may also be configured to be able to generate audible output(s), via a speaker, speaker jack, audio output port, audio output device, earphones, and/or other similar devices, now known or later developed in the future.

Processing element 1110 can include one or more computing devices, hardware, firmware, or a software application configured to processes electronic representations of images. In examples, processing element 1110 can contain computer implemented algorithms for image noise filtering, edge enhancement, histogram equalization, contrast stretching, morphological filtering, and so on.

Printer engine 1112 can also include a print head, one or more ink cartridges, and a paper feed assembly (i.e. an inkjet printer). Alternatively, printer engine 1112 may include a laser printer assembly, having a laser scanning unit, photoreceptor drum, toner hopper, fuser, and developer roller (i.e., a laser printer). Printer engine 1112 can be communicatively coupled to receive representations of electronic images from receiving element 1102.

Figure 12:
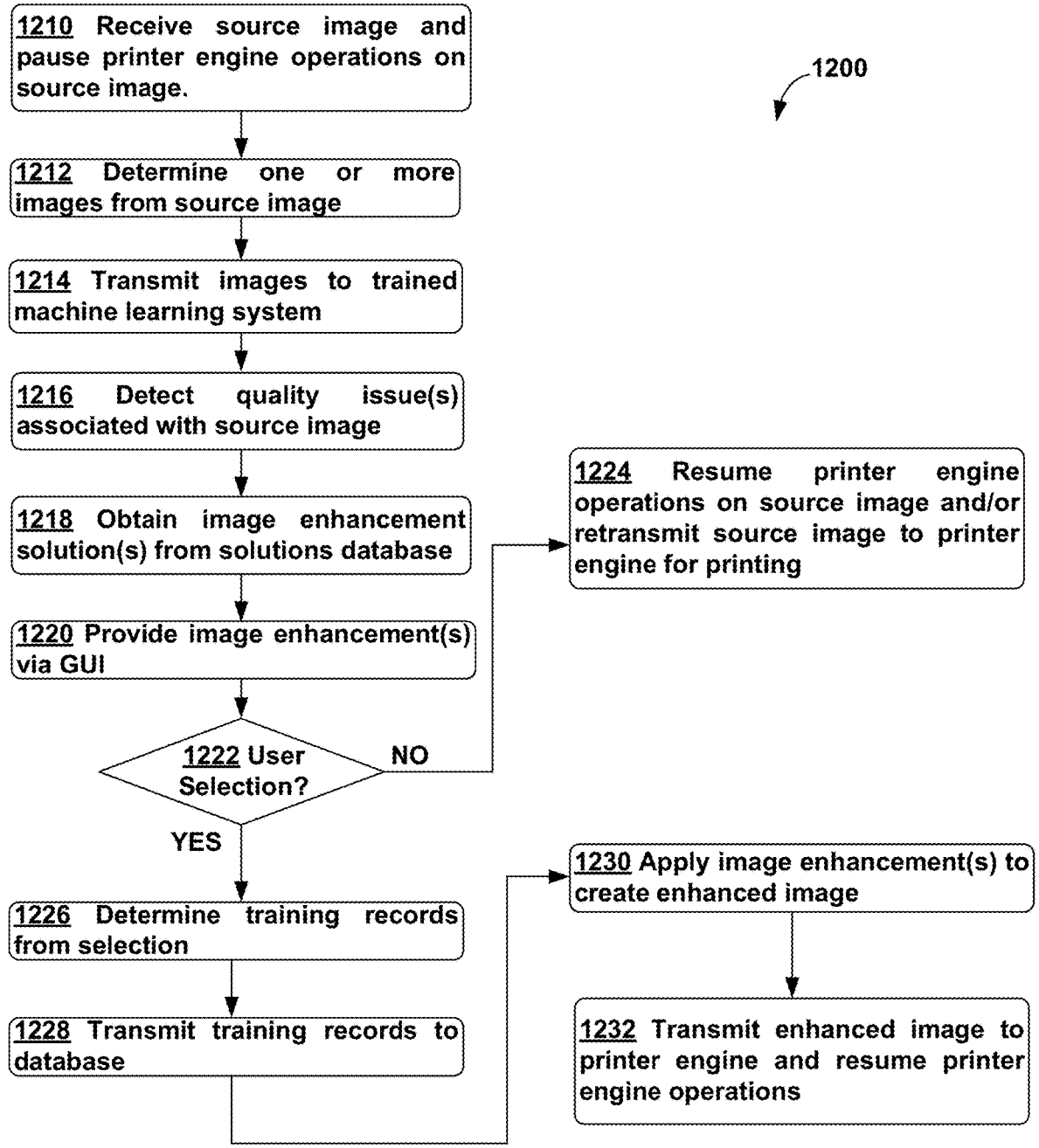
FIG. 12 is a flowchart of a method for resolving potential quality issues associated with a source image, according to example embodiments.

FIG. 12 is a flow chart of illustrating method 1200, according to example embodiments. Method 1200 is a method for resolving quality issues associated with a source image. Method 1200 can be carried out at least by computing device 200, devices on computing network 140, and/or components of printing device 1100. Notably, method 1200 may be simplified by the removal of any one or more of the blocks shown therein. Further, the blocks of method 1200 may be combined with features, aspects, and/or implementations of any of the previous figures or otherwise described herein.

Method 1200 can begin at block 1210, when a source image (not shown in FIG. 12) is received by receiving element 1102. For example, printing device 1100 can receive, perhaps from network 140, a digital representation of an image (i.e., a source image). Then, printing device 1100, via receiving element 1102, can store the source image in memory before sending the image to printer engine 1112 to be printed. In line with the discussion above regarding FIGS. 10A and 10B, the source image can contain quality issues that can affect the actual image printed by the printer engine. Consequently, upon receiving the source image, printing device 1100 may pause the operations of printer engine 1112 on the source image to preemptively ensure that no quality issues are present on the source image.

At block 1212, printing device 1100 can determine a global image and/or one or more local images with respect to the source image. As described in the context of FIG. 5, to obtain the global image, printing device 1100 can create a thumbnail that captures the entirety of source image. And to obtain local image(s), printing device 1100 can perform scanning operations (e.g., perform linear, grid-scan and/or random scans) on the source image. The number of global and/or local images can vary depending on the configuration of printing device 1100. In one example, 1 global image and 3 local images can be determined. In another example, 2 global images can be determined. In yet another example, 10 local images can be determined. Other examples are also possible.

At block 1214, the images determined from block 1212 (i.e., the global image and/or one or more local images determined by printing device 1100) can be communicated to trained machine learning system 1104 to predict quality issues associated with the source image. And at block 1216, trained machine learning system 1104 can apply one or more trained machine learning models on the determined images to predict quality issues. In examples, the one or more trained machine learning models can take the form of CNN model(s) 420.

In some examples, CNN models(s) 420 can contain a CNN trained on local images (referred to herein as the local CNN) and another CNN trained on global images (referred to herein as the global CNN). Specifically, the local CNN can be utilized to predict quality issues via local images, whereas the global CNN can be utilized to predict quality issues via global images. Accordingly, at block 1216, global images can be provided to the global CNN and local images can be provided to the local CNN.

In other examples, CNN model(s) 420 can contain a single CNN trained with both global images and local images. Specifically, the single CNN can be utilized to predict quality issues via with both local and global images. When using the single CNN, printing device 1100 can be configured to scale global images and local images to have equivalent dimensions.

At block 1216 trained machine learning system 1104 may utilize post-processing techniques, such as techniques described with respect to post-processing 440, to produce a prediction regarding quality issues associated with the source image. And at block 1218, printing device 1100 can retrieve one or more solutions to resolve the predicted quality issues from solutions database 1106 based on the prediction regarding quality issues of block 1216. In an example implementation of blocks 1216 and 1218, CNN model(s) 420 may produce a prediction vector of size N, where N could be the number of possible quality issues known to printing device 1100. Then, post-processing 440 can take the prediction vector as input and may reduce the possible predictions from N to smaller subset. In some cases, the subset could be of size 1, where 1 predicted quality issue is outputted by trained machine learning system 1104. In other cases, the subset could be of size 5, where 5 predicted quality issues are outputted by trained machine learning system 1104. Regardless, printing device 1100 may retrieve, from solutions database 1106, one or more solutions to resolve the outputted predicted quality issue(s).

At block 1220, the predicted quality issues and the one or more solutions to resolve the predicted quality issues can be provided to user 1130 via user interface 1108. In examples, the predicted quality issues and the one or more solutions can take the form of a prompt, a notification, a report, an order, or another type of electronic representation on user interface 1130. Additionally, the electronic representation may include one or more user selectable options that allow users to take further actions. In some examples, the predicted quality issues can include a confidence value and/or other data related to accuracy of the prediction. The confidence value can be determined by trained machine learning system 1104. For example, a confidence value in the range of 0 to 100 can be determined for (and perhaps output with) a predicted quality issue, where a confidence value of 0 would indicate that trained machine learning system 1104 had no (0%) confidence in the prediction, where a confidence value of 100 would indicate that trained machine learning system 1104 had certain (100%) confidence in the prediction, and where a value between 0 and 100 would indicate a percentage confidence in the prediction. Other techniques are also possible.

At block 1222, printing device 1100 can determine whether user 1130 has selected or otherwise chosen a solution of the one or more solutions provided via user interface 1108. If a solution has been selected, method 1200 can continue to block 1226. Otherwise, method 1200 can continue to block 1224.

Since no selection of a solution is made, at block 1224, the source image can be communicated to printer engine 1112 and printing operations can resume with the source image.

At block 1226, upon receiving a selected solution from user 1130, printing device 1100 may record the selected solution as a new training record for trained machine learning system 1104. More specifically, the selected solution may be used as a ground truth value, while the source image may be used as training input (e.g., feature vector). And at block 1228, printing device 1100 can communicate the new training record to trained machine learning system 1104 or to data storage containing training records used to train trained machine learning system 1104, perhaps data storage on network 140. In some examples, the trained machine learning system 1104 can be configured to retrain, based on the new training records, one or more trained machine learning models. It should be noted that in method 1200, blocks 1226 and 1228 can be omitted and/or blocks 1226 and 1228 can be carried out in parallel with other aspects of method 1200.

At block 1230, printing device 1100 can apply the selected solution to resolve the quality issues associated with the source image. In some examples, applying the selected solution can involve utilizing processing element 1110 to perform image enhancements on the source image. This scenario may occur if the selected solution involves traditional computer vision algorithms or techniques, such as filtering and histogram equalization, that may be part of processing element 1110. More specifically, processing element 1110 can take as input the source image and output an enhanced image devoid of the predicted quality issues. In other examples, applying the selected solution can involve utilizing trained machine learning system 1104 to perform image enhancements on the source image. This scenario may occur if the selected solution involves CNN or other neural network based image processing techniques. More specifically, trained machine learning system 1104 may include one or more trained machine learning models that can take as input the source image and output an enhanced image devoid of the predicted quality issues.

At block 1232, the enhanced image can be transmitted to printer engine 1112 and printing operations can resume with the enhanced image, rather than with the source image.

Figure 13:
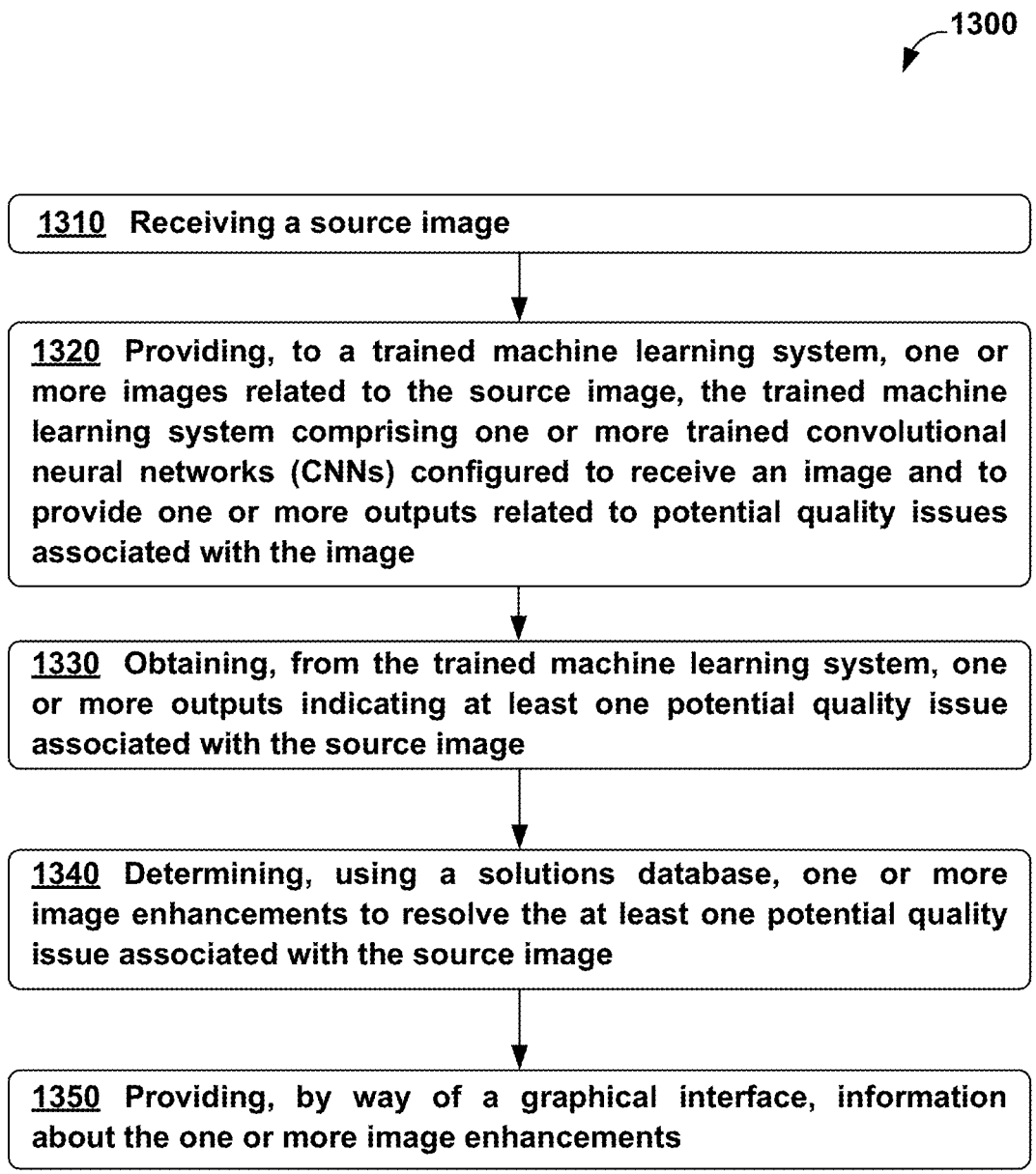
FIG. 13 shows a flowchart for a method, according to example embodiments.

FIG. 13 shows a flowchart for a method 1300, according to an example embodiment. Method 1300 can be executed by one or more processors of a printing device, such as multifunction printing device 1100. Method 1300 can begin at block 1310, where the printing device can receive a source image, such as discussed herein at least in the context of FIGS. 11 and 12.

At block 1320, the printing device can provide, to a trained machine learning system, the one or more images related to the source image, the trained machine learning system comprising one or more trained convolutional neural networks (CNNs) configured to receive an image and to provide one or more outputs related to potential quality issues associated with the image, such as discussed herein at least in the context of FIGS. 3, 4, 5, 11, and 12.

At block 1330, the printing device can obtain, from the trained machine learning system, one or more outputs indicating at least one potential quality issue associated with the source image, such as discussed herein at least in the context of FIGS. 3, 4, 5, 11, and 12.

At block 1340, the printing device can determine, using a solutions database, one or more solutions to resolve the at least one potential quality issue associated with the source image, such as discussed herein at least in the context of FIGS. 11 and 12.

At block 1350, the printing device can provide, by way of a graphical interface, information about the one or more image enhancement, such as discussed herein at least in the context of FIGS. 11 and 12.

In some examples, receiving the source image comprises receiving a print request to print the source image and suspending the print request from being executed by a print engine of the printing device.

In some examples, the printing device can receive, by way of the graphical interface, a selected image enhancement of the one or more image enhancements, apply the selected image enhancement to the source image, thereby creating an enhanced image, provide, to the print engine, the enhanced image, and resume the print request with the enhanced image, such as discussed herein at least in the context of FIGS. 11 and 12.

In some examples, the printing device can receive, by way of the graphical interface, an indication that none of the one or more image enhancements have been selected and resume the print request with the source image, such as discussed herein at least in the context of FIGS. 11 and 12.

In some examples, the trained machine learning system comprises one or more trained CNNs configured to receive an input image and output an enhanced input image, and the printing device can further receive, by the graphical interface, a selected image enhancement from the one or more image enhancements, identify whether the selected image enhancement uses CNN-based image enhancements, and after identifying that the selected image enhancement uses CNN-based image enhancements, provide the source image to the trained machine learning system for processing, such as discussed herein at least in the context of FIGS. 11 and 12.

In some examples, wherein the printing device can receive a selected image enhancement from the one or more image enhancements, record the selected image enhancement, determine new training records for the trained machine learning system based on the selected image enhancement, and transmit, to the trained machine learning system, the new training records, where the trained machine learning system is configured to retrain, based on the new training records, the one or more trained CNNs, such as discussed herein at least in the context of FIGS. 3, 4, 11 and 12.

In some examples, the one or more images comprise a global image that depicts substantially all of the source image, and providing the one or more images to the trained machine learning system comprises applying the one or more trained CNNs to each of the one or more images by associating an image of the one or more images as the global image, after associating the image of the one or more images as the global image, selecting a trained CNN of the one or more trained CNNs that is associated with the global image, and using the selected trained CNN that is associated with the global image such as discussed herein at least in the context of FIGS. 3, 4, 5, 11 and 12.

In some examples, the one or more images comprise a local image that depicts a portion of the source image, and providing the one or more images to the trained machine learning system comprises applying the one or more trained CNNs to each of the one or more images by associating an image of the one or more images as the local image, after associating the image of the one or more images as the local image, selecting a trained CNN of the one or more trained CNNs that is associated with the local image, and using the selected trained CNN that is associated with the local image, such as discussed herein at least in the context of FIGS. 3, 4, 5, 11 and 12.

In some examples, the one or more image enhancements can include at least one of histogram equalization, edge enhancement, super-resolution, denoising, dehazing, or morphological filters, such as discussed herein at least in the context of FIGS. 10A-B, 11 and 12.

In some examples, the printing device can scale each of the one or more images to have equivalent dimensions, such as discussed herein at least in the context of FIGS. 5, 11 and 12.

VII. Conclusion

The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

I claim:

1. A printing device, comprising:
one or more processors configured to carry out operations comprising:
receiving a print request to print a source image;
suspending the print request from being executed by a print engine of the printing device;
providing, to a trained machine learning system, one or more images related to the source image, wherein the trained machine learning system comprises one or more trained convolutional neural networks (CNNs) configured to receive an image and to provide one or more outputs related to potential quality issues associated with the image;
obtaining, from the trained machine learning system, one or more outputs indicating at least one potential quality issue associated with the source image;
determining, using a solutions database, one or more image enhancements to resolve the at least one potential quality issue associated with the source image;
providing, by way of a graphical interface, information about the one or more image enhancements;
receiving, by way of the graphical interface, an indication that none of the one or more image enhancements have been selected; and
in response to the indication, resuming the print request with the source image.

2. The printing device of claim 1, further comprising:
receiving, by way of the graphical interface, a selected image enhancement of the one or more image enhancements;
applying the selected image enhancement to the source image, thereby creating an enhanced image;
providing, to the print engine, the enhanced image; and
resuming the print request with the enhanced image.

3. The printing device of claim 1, wherein the trained machine learning system further comprises one or more trained CNNs configured to receive an input image and output an enhanced input image, and wherein operations further comprise:
receiving, by the graphical interface, a selected image enhancement from the one or more image enhancements;
identifying whether the selected image enhancement uses CNN-based image enhancements; and
after identifying that the selected image enhancement uses CNN-based image enhancements, providing the source image to the trained machine learning system for processing.

4. The printing device of claim 1, wherein the operations further comprise:
receiving a selected image enhancement from the one or more image enhancements;
recording the selected image enhancement;
determining new training records for the trained machine learning system based on the selected image enhancement; and
transmitting, to the trained machine learning system, the new training records, wherein the trained machine learning system is configured to retrain, based on the new training records, the one or more trained CNNs.

5. The printing device of claim 1, wherein the one or more image enhancements include at least one of: histogram equalization, edge enhancement, super-resolution, denoising, dehazing, or morphological filters.

6. The printing device of claim 1, wherein the one or more images comprise a global image that depicts substantially all of the source image, and wherein providing the one or more images to the trained machine learning system comprises applying the one or more trained CNNs to each of the one or more images by:
   associating an image of the one or more images as the global image;
   after associating the image of the one or more images as the global image, selecting a trained CNN of the one or more trained CNNs that is associated with the global image; and
   using the selected trained CNN that is associated with the global image.

7. The printing device of claim 1, wherein the one or more images comprise a local image that depicts a portion of the source image, and wherein providing the one or more images to the trained machine learning system comprises applying the one or more trained CNNs to each of the one or more images by:
   associating an image of the one or more images as the local image;
   after associating the image of the one or more images as the local image, selecting a trained CNN of the one or more trained CNNs that is associated with the local image; and
   using the selected trained CNN that is associated with the local image.

8. The printing device of claim 1, wherein operations further comprise scaling each of the one or more images to have equivalent dimensions.

9. A computer-implemented method, comprising:
   receiving, at a printing device, a print request to print a source image;
   suspending the print request from being executed by a print engine of the printing device;
   providing, to a trained machine learning system, one or more images related to the source image, wherein the trained machine learning system comprises one or more trained convolutional neural networks (CNNs) configured to receive an image and to provide one or more outputs related to potential quality issues associated with the image;
   obtaining, from the trained machine learning system, one or more outputs indicating at least one potential quality issue associated with the source image;
   determining, using a solutions database, one or more image enhancements to resolve the at least one potential quality issue associated with the source image; and
   providing, by way of a graphical interface, information about the one or more image enhancements;
   receiving, by way of the graphical interface, an indication that none of the one or more image enhancements have been selected; and
   in response to the indication, resuming the print request with the source image.

10. The computer-implemented method of claim 9, further comprising:
   receiving, by way of the graphical interface, a selected image enhancement of the one or more image enhancements;
   applying the selected image enhancement to the source image, thereby creating an enhanced image;
   providing, to the print engine, the enhanced image; and
   resuming the print request with the enhanced image.

11. The computer-implemented method of claim 9, wherein the trained machine learning system further comprises one or more trained CNNs configured to receive an input image and output an enhanced input image, the method further comprising:
   receiving, by the graphical interface, a selected image enhancement from the one or more image enhancements;
   identifying whether the selected image enhancement uses CNN-based image enhancements; and
   after identifying that that selected image enhancement uses CNN-based image enhancements, providing the source image to the trained machine learning system for processing.

12. The computer-implemented method of claim 9, the method further comprising:
   receiving a selected image enhancement from the one or more image enhancements;
   recording the selected image enhancement;
   determining new training records for the trained machine learning system based on the selected image enhancement; and
   transmitting, to the trained machine learning system, the new training records, wherein the trained machine learning system is configured to retrain, based on the new training records, the one or more trained CNNs.

13. The computer-implemented method of claim 9, wherein the one or more image enhancements include at least one of: histogram equalization, edge enhancement, super-resolution, denoising, dehazing, or morphological filters.

14. The computer-implemented method of claim 9, wherein the one or more images comprise a global image that depicts substantially all of the source image, and wherein providing the one or more images to the trained machine learning system comprises applying the one or more trained CNNs to each of the one or more images by:
   associating an image of the one or more images as the global image;
   after associating the image of the one or more images as the global image, selecting a trained CNN of the one or more trained CNNs that is associated with the global image; and
   using the selected trained CNN that is associated with the global image.

15. The computer-implemented method of claim 9, wherein the one or more images comprise a local image that depicts a portion of the source image, and wherein providing the one or more images to the trained machine learning system comprises applying the one or more trained CNNs to each of the one or more images by:
   associating an image of the one or more images as the local image;
   after associating the image of the one or more images as the local image, selecting a trained CNN of the one or more trained CNNs that is associated with the local image; and
   using the selected trained CNN that is associated with the local image.

16. An article of manufacture comprising non-transitory data storage storing at least computer-readable instructions that, when executed by one or more processors of a printing device, cause the printing device to perform tasks comprising:
- receiving a print request to print a source image;
- suspending the print request from being executed by a print engine of the printing device;
- providing, to a trained machine learning system, one or more images related to the source image, wherein the trained machine learning system comprises one or more trained convolutional neural networks (CNNs) configured to receive an image and to provide one or more outputs related to potential quality issues associated with the image;
- obtaining, from the trained machine learning system, one or more outputs indicating at least one potential quality issue associated with the source image;
- determining, using a solutions database, one or more image enhancements to resolve the at least one potential quality issue associated with the source image; and
- providing, by way of a graphical interface, information about the one or more image enhancements;
- receiving, by way of the graphical interface, an indication that none of the one or more image enhancements have been selected; and
- in response to the indication, resuming the print request with the source image.

* * * * *